(12) United States Patent
Gustaf

(10) Patent No.: US 7,835,769 B2
(45) Date of Patent: *Nov. 16, 2010

(54) WIRELESS POINT TO MULTIPOINT SYSTEM

(75) Inventor: Christopher A. Gustaf, San Diego, CA (US)

(73) Assignee: Trango Systems, Inc., San Diego, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/107,211

(22) Filed: Apr. 22, 2008

(65) Prior Publication Data

US 2008/0191946 A1   Aug. 14, 2008

Related U.S. Application Data

(60) Continuation of application No. 11/267,522, filed on Nov. 3, 2005, now Pat. No. 7,363,058, which is a division of application No. 10/264,983, filed on Oct. 4, 2002, now Pat. No. 7,127,255, which is a continuation-in-part of application No. 10/263,210, filed on Oct. 1, 2002, now abandoned.

(51) Int. Cl.
*H04B 1/38* (2006.01)
*H04M 1/00* (2006.01)

(52) U.S. Cl. ................. 455/562.1; 455/575.7; 343/702; 343/824

(58) Field of Classification Search ................. 455/561, 455/562.1, 575.7, 129, 269; 343/702, 824, 343/845, 893, 700 MS
See application file for complete search history.

(56) References Cited

U.S. PATENT DOCUMENTS

| 4,755,821 A | 7/1988 | Itoh et al. ............. 343/700 MS |
| 5,001,493 A | 3/1991 | Patin et al. ............ 343/700 MS |
| 5,382,959 A | 1/1995 | Pett et al. ............. 343/700 MS |
| 5,444,453 A | 8/1995 | Lalezari ............... 343/700 MS |

(Continued)

FOREIGN PATENT DOCUMENTS

EP    0 135 049    3/1985    ................ 13/24

(Continued)

OTHER PUBLICATIONS

Douglas E. Cromer, "Interworking with TCP/IP," pp. 73-77 (3rd ed., 1995).

(Continued)

*Primary Examiner*—Nguyen Vo
(74) *Attorney, Agent, or Firm*—Nelson Mullins Riley & Scarborough, LLP

(57) ABSTRACT

A patch array antenna includes a planar base on which is defined a ground plane and feed positions that are electrically isolated from the ground plane. A plurality of patch elements are configured to resonate over a predetermined frequency range. Each patch element is isolated from the ground plane and disposed on the base over the ground plane so that an air dielectric is defined between the patch element and the ground plane. Each patch element defines a resonant portion that is electrically connected to a respective feed position. A feed network is defined on the base that electrically connects the feed positions to one or more output points on the base.

18 Claims, 27 Drawing Sheets

U.S. PATENT DOCUMENTS

| | | | |
|---|---|---|---|
| 5,586,122 A | 12/1996 | Suzuki et al. | 370/347 |
| 5,936,949 A | 8/1999 | Pasternak et al. | 370/328 |
| 6,005,519 A | 12/1999 | Burns | 343/700 MS |
| 6,016,311 A | 1/2000 | Gilbert et al. | 370/280 |
| 6,281,845 B1 * | 8/2001 | Ittipiboon et al. | 343/700 MS |
| 6,317,084 B1 | 11/2001 | Chen et al. | 343/700 MS |
| 6,324,184 B1 | 11/2001 | Hou et al. | 370/468 |
| 6,690,327 B2 | 2/2004 | McKinzie, III et al. | 343/700 MS |
| 6,864,840 B2 | 3/2005 | Zhu et al. | 343/700 MS |
| 6,927,730 B2 | 8/2005 | Tang et al. | 343/700 MS |
| 6,993,044 B2 | 1/2006 | McKinnon, III et al. | 370/468 |
| 7,006,044 B2 | 2/2006 | Choi et al. | 343/700 MS |
| 7,031,720 B2 | 4/2006 | Weerakoon et al. | 455/452.2 |
| 7,127,255 B2 * | 10/2006 | Hsu et al. | 455/452.2 |
| 7,363,058 B2 * | 4/2008 | Gustaf | 455/562.1 |

FOREIGN PATENT DOCUMENTS

| | | | |
|---|---|---|---|
| WO | WO 03/028156 A2 | 4/2003 | 13/10 |

OTHER PUBLICATIONS

Supplement to IEEE Standard for Information Technology, Nov. 1999.

Assembly drawing and photographs of single patch antenna, Feb. 21, 2000.

WirelessHome Webpage, Oct. 30, 2000.

Press Release from Motorola, Inc. regarding Motorola's Canopy System, entitled "Motorola's Wireless Broadband Internet Access Solution Bridges Digital Divide in 5GHz Band." Jun. 25, 2002.

Data Sheet regarding Axxcelera Broadband Wireless AB-ACCESS "Point-to-Multipoint System." Aug. 2003.

* cited by examiner

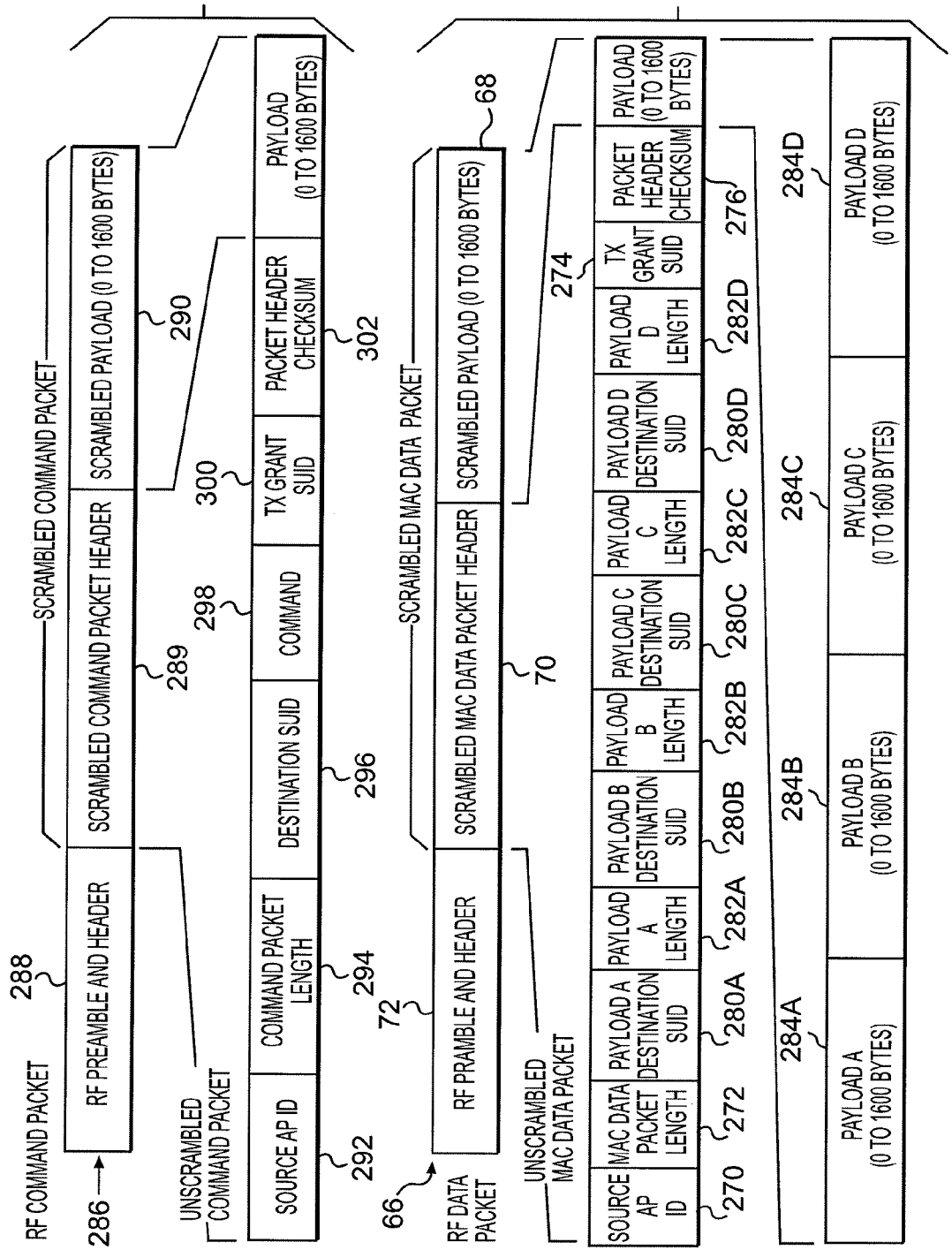

WIRELESS POINT TO MULTIPOINT SYSTEM

CROSS-REFERENCE TO RELATED APPLICATIONS

This is a continuation of U.S. application Ser. No. 11/267,522, filed Nov. 3, 2005 (now U.S. Pat. No. 7,363,058), which is a division of U.S. application Ser. No. 10/264,983, filed Oct. 4, 2002 (now U.S. Pat. No. 7,127,255), which is a continuation-in-part of U.S. application Ser. No. 10/263,210, filed Oct. 1, 2002, now abandoned, entitled "Wireless Point to Multipoint System," the entire disclosures of which are incorporated by reference herein.

BACKGROUND OF THE INVENTION

The present invention relates to wireless point to multipoint systems. Systems are known in which a base station transmits electromagnetic signals to, and receives electromagnetic signals from, subscriber units within a sector allocated to the base station. User devices are attached to each subscriber unit, and the base station forwards data to the user devices through their corresponding subscriber units as the data is received by the base station from an outside source, for example the Internet. In one type of known system, the base station designates certain time periods, called "contention periods," in which the subscriber units are eligible to transmit back to the base station. If a subscriber unit has data to be forwarded to the base station, the subscriber unit does so during the contention period.

Wireless systems are also known which do not have contentions periods but which divide up the available time into slots during which each subscriber unit is allowed to transmit back to the base station. The number of slots is directly related to the number of subscribers in the sector. These type systems also tend to incorporate base stations which will reserve a portion the available bandwidth for traffic from the subscriber to the base station and a percentage of available bandwidth for traffic from the base station to the subscriber.

Wireless systems are known that include a plurality of user devices connected to a subscriber unit that wirelessly communicates with a base station. When the base station receives an Ethernet packet destined to one of the user devices, the base station refers to a database table that associates each user device with its subscriber unit. The table includes a predetermined limit of user devices, for example eight, that may be associated with a subscriber unit in the table at any time. In searching for a user device address in the table, such systems search sequentially through the table addresses for the desired address. Accordingly, such tables are limited in the number of user devices that can be associated with any given subscriber unit and become inefficient in use of the table as the number of entries increases. To reduce the numbers of entries, multiple subscriber units may be attached to a switch, the address of which is then provided in the table.

SUMMARY OF THE INVENTION

The present invention recognizes and addresses disadvantages of prior art constructions and methods. Accordingly, it is an object of the present invention to provide an improved wireless point to multipoint system.

This and other objects are achieved by a point to multipoint wireless communication system having an access point configured to receive data signals from an external system. The access point has an antenna, a processor, and circuitry in communication with the access point antenna and controlled by the access point processor to transmit wireless electromagnetic signals corresponding to the data signals to, and to receive wireless electromagnetic signals from, a geographic area. A plurality of subscriber units are disposed within the area, each subscriber unit having an antenna, a processor, and circuitry controlled by the subscriber unit processor to transmit wireless electromagnetic signals to, and receive wireless electromagnetic signals from, the access point for communication with the external system. The access point allocates data bandwidth among the subscriber units based at least in part on the past use of bandwidth to transmit data between the access point and the subscriber units.

A method according to an embodiment of the present invention for allocating bandwidth availability within a point to multipoint wireless communication system includes providing an access point. The access point has an antenna, a processor and circuitry in communication with the access point antenna and controlled by the access point processor to transmit wireless electromagnetic signals to, and receive wireless electromagnetic signals from, a geographic area. A plurality of subscriber units are provided within the area, each subscriber unit having an antenna, a processor and circuitry controlled by the subscriber unit processor to transmit wireless electromagnetic signals to, and receive wireless electromagnetic signals from, the access point. Data bandwidth is allocated among the subscriber units based at least in part on the past use of bandwidth to transmit data between the access point and the subscriber units.

A patch array antenna according to an embodiment of the present invention includes a planar base on which is defined a ground plane and feed positions that are physically isolated from the ground plane. A plurality of patch elements are configured to resonate over a predetermined frequency range. Each patch element is isolated from the ground plane and is disposed on the base over the ground plane so that an air dielectric is defined between the patch element and the ground plane. Each patch element defines a resonant portion that is electrically connected to a respective feed position. A feed network is defined on the base and electrically connects the feed positions to one or more output points on the base.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended drawings, in which:

FIGS. 18A and 18B are a diagrammatic illustration of command and data packets transmitted from the access point in an embodiment of the present invention;

Figure 1:
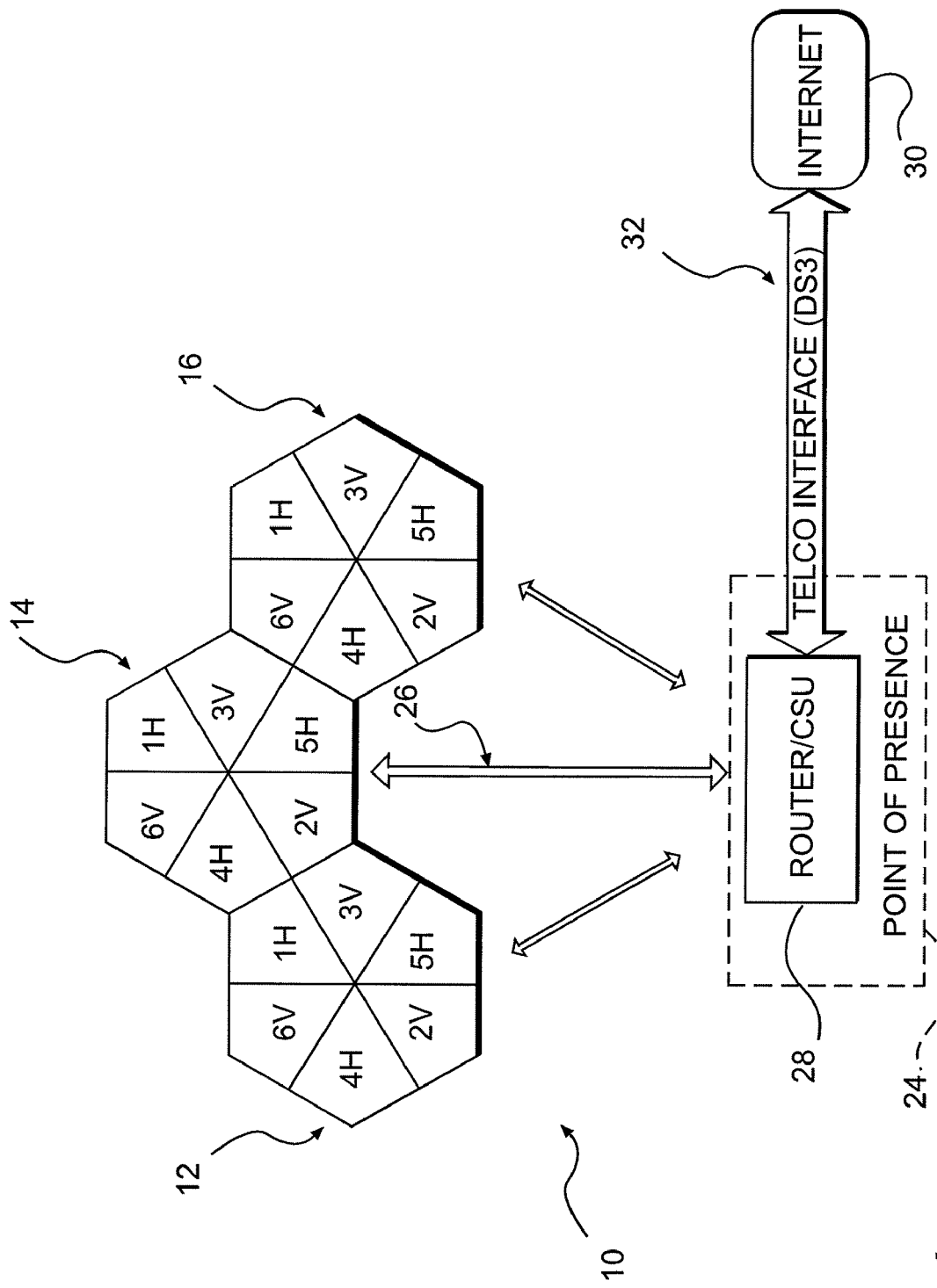
FIG. 1 is a block diagram illustrating a wireless point to multipoint system in accordance with an embodiment of the present invention.

Repeat use of reference characters in the present specification and drawings is intended to represent same or analogous features or elements of the invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A. System Configuration

Figure 2:
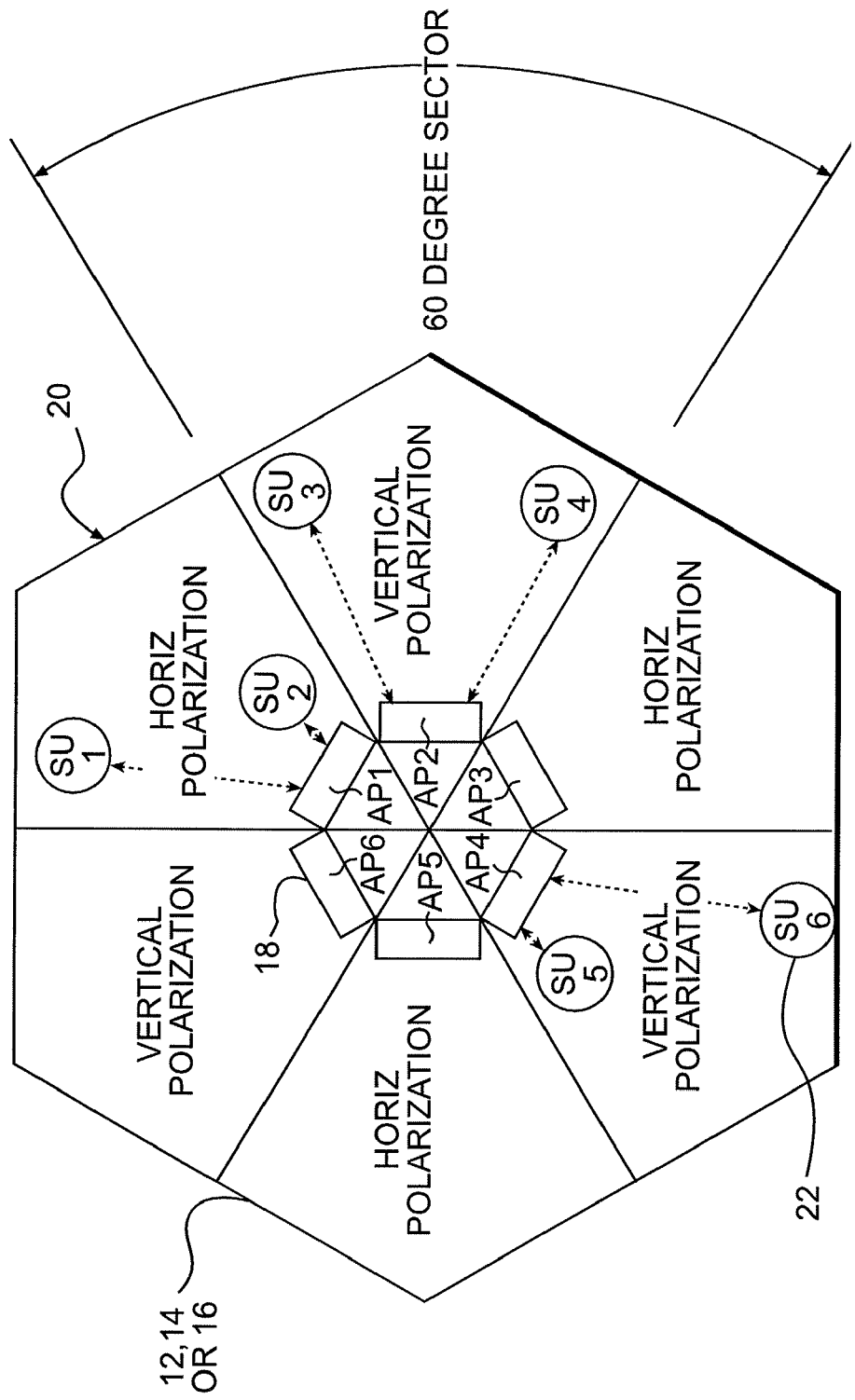
FIG. 2 is a block diagram of a cell as shown in FIG. 1.

An exemplary deployment of a point to multipoint fixed wireless network system 10 comprised of three base station cells is shown in FIG. 1. Each base station cell 12, 14 and 16 is divided into sixty degree (60°) coverage areas, referred to herein as "sectors," in which are disposed subscribers wishing to access the Internet or other external systems. A base station having six access points 18 is located at the center of the six sectors 20, as shown in FIG. 2.

The cells shown in FIG. 1 represent geographic areas. At the center of each cell, and therefore at the convergence of the six sectors, is a tower or other suitable structure on which an access point for each sector is mounted facing out into its sector, as shown in FIG. 2. That is, the collection of access points comprises the base station. As described in more detail below, each access point includes an antenna through which the access point transmits electromagnetic signals to, and receives electromagnetic signals from, one or more subscriber units 22 (FIG. 2). Each subscriber unit also contains an antenna and circuitry through which the subscriber unit receives data transmissions from the access point destined for user devices attached to the subscriber unit. A subscriber unit also transmits data from its user device(s) to the access point.

To avoid interference among sectors, each access point uses an antenna polarization and transmission frequency different from its adjacent access points. In the example shown in FIG. 2, adjacent sectors alternate between vertical and horizontal polarization.

Furthermore, each access point operates at a specific frequency channel. As should be understood, the FCC regulates and allocates frequency bandwidths used in communication systems. The embodiment of the present invention described herein, for example, operates over a total frequency range from 5.725 GHz to 5.850 GHz. This frequency range is divided into frequency channels within which the individual sectors operate. The access point and subscriber units in each sector modulate data on their sector's carrier frequency, which is centered in the channel, using complementary code keying, a form of quadrature phase shift keying with highly uncorrelated phase shift patterns. Complimentary code keying, which is also typically used by wireless LAN systems, should be well understood in this art and is, therefore, not discussed in detail herein. Furthermore, it should be understood that other suitable modulation techniques may be employed and that complimentary code keying is provided for purposes of example only.

The 5.725 GHz-5.850 GHz frequency band is divided into six channels, leading to the division of each cell into its six sectors, each operating on one of the six channels. The number of available channels may be increased by using each channel frequency twice in a cell within sectors having opposite polarity. Assume, for example, that oppositely facing access points AP1 and AP4 in FIG. 2, along with their respective subscriber units, operate on the same frequency but with different polarization. In such an arrangement, each cell uses each of three channels twice. Since six channels are available, each cell tower may host two rings of six access points, one ring above the other, where each ring uses a different set of three frequency channels. The difference in polarization and physical orientation between AP1 and AP4 reduces the risk of interference between the two access points, but the access points may preferably be shielded from one another to provide further protection.

Any suitable shielding may be used between access points or between two rings of access points. Shielding may be provided between the rings to prevent interference. For example, each access point may be received in a concave shield that opens into the access point's sector. The shield is constructed from an underlying metal sheet coated with a radio frequency absorbing material. Such shields are commonly used and are thereby not described in more detail herein.

Returning to FIG. 1, base stations are disposed proximate each other to establish adjacent cells 12, 14 and 16. Each base station communicates with an Internet service provider point of presence 24 through a wired or wireless backhaul 26. The ISP point of presence includes a router and telco interface 28 that communicates with the Internet 30 through a telecommunications connection 32.

Figure 3:
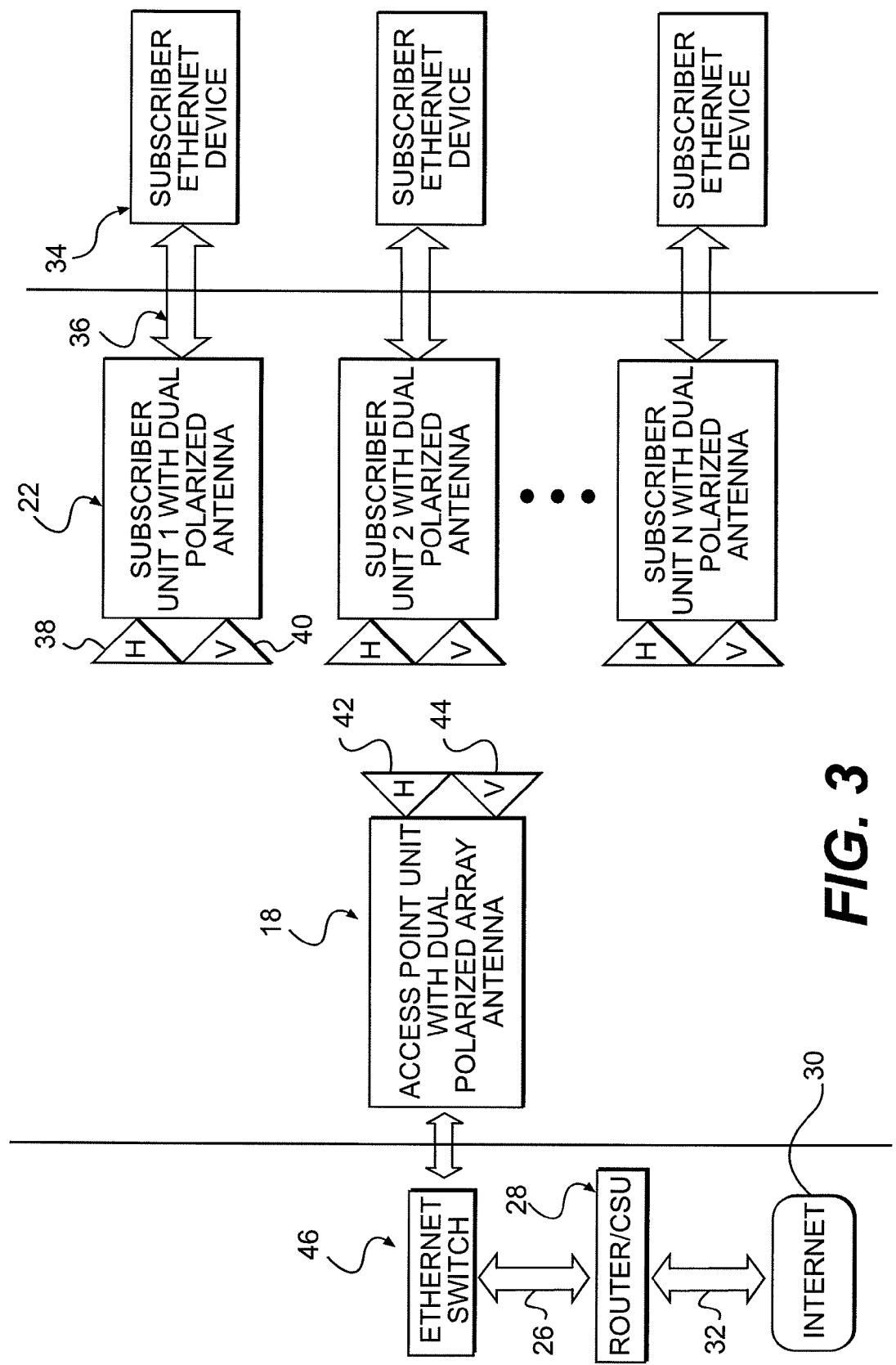
FIG. 3 is a functional block diagram illustration of the wireless point to multipoint system as shown in FIG. 1.

FIG. 3 provides a block diagram illustration of a single sector covering three subscribers, each connected to a data interface device. Often, the data interface device will be a switch, computer or other Ethernet device 34, but it may be any other suitable device that receives data and collects the data into a predetermined form for output to a communication system. Ethernet-based cameras, for example, may be used in security systems to output video images for transmission to remote locations. More commonly, however, devices 34 are computers having Ethernet cards that communicate over Ethernet cables 36 to a subscriber transmitter/receiver unit 22. Ethernet connections are in highly common use and, for ease of explanation, the present discussion presents the system in terms of an Ethernet example.

Each subscriber unit includes a pair of antenna arrays 38 and 40 for wireless communication with an access point receiver/transmitter 18. Antenna arrays 38 and 40, which are described in more detail below, are of opposite (for example horizontal and vertical) polarization, so that the subscriber unit may communicate in either polarization. Similarly, access point 18 defines horizontal and vertical polarization antenna arrays 42 and 44.

Each base station in each cell (FIG. 1) includes an Ethernet switch 46 that communicates with each access point 18 at the base station. Ethernet switch 46 communicates with the point of presence router 28 over backhaul 26. Router 28, in turn, communicates with the Internet 30 over telecommunications interface 32.

The construction and operation of Ethernet switches should also be understood in this art. As should also be understood, such switches may be used to facilitate communications not only from the access point to point of presence router 28, but also communications from one access point to another within the same cell. Thus, the system may be used to facilitate communications among subscribers in different cells through an interconnection of Ethernet switches. Moreover, the system may be used in a local network without connection to the Internet. For example, the local network may comprise a single cell with multiple access points communicating with a single Ethernet switch controlled by a server computer. Subscriber transmissions intended for a subscriber in a different sector are passed by the access point to the Ethernet switch, which forwards the transmission to the access point in the appropriate sector. The system may also be arranged so that subscribers within the same sector may communicate with each other through an access point without communication with the switch. All such communications may be effected using TCP/IP protocol, which should be well understood in this art.

Figure 4:
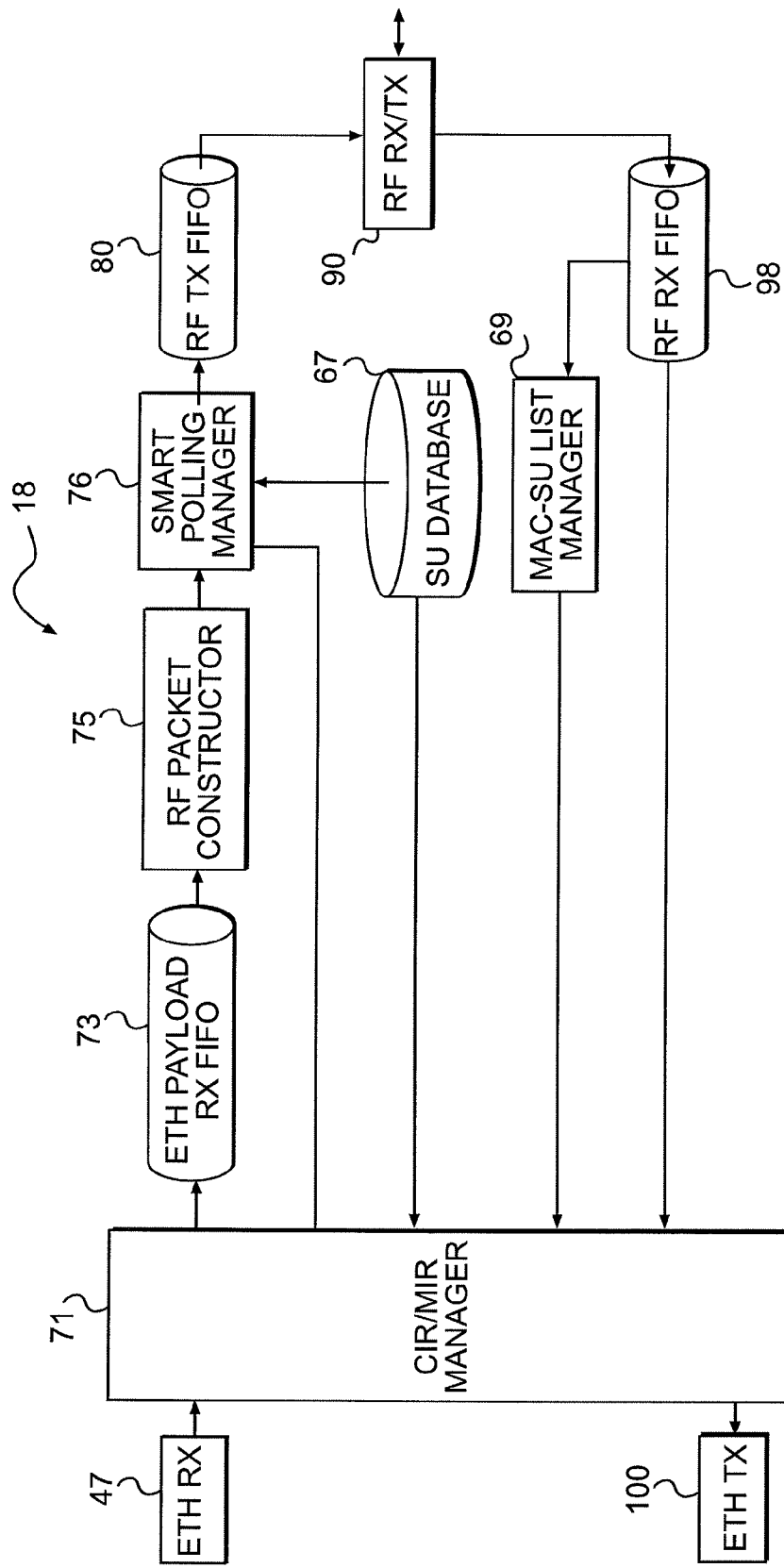
FIG. 4 is a functional block diagram illustration of an access point transmitter and receiver for use in accordance with an embodiment of the present invention.

FIG. 4 provides a functional block diagram illustration of an access point transmitter/receiver 18 as it receives Ethernet packets and transmits corresponding radio frequency (RF) packets to the subscriber units (downstream communications) and as it receives RF packets from the subscriber units and outputs corresponding Ethernet packets to an upstream Ethernet system (upstream communications). FIG. 4 is described in conjunction with FIG. 5, which provides a circuit block diagram of the access point.

The access point receives Ethernet packets at 47 through an Ethernet port 48 from an Ethernet connection to Ethernet switch 46 (FIG. 3). Ethernet port 48 is a physical interface, for example a cable connection, as should be understood in this art.

As should also be understood, an Ethernet packet is a sequence of bits comprised of a preamble, a header, a payload and a checksum. The preamble includes timing signals to enable a receiver's microprocessor to set up an internal clock so that the receiver properly receives the packet. The header includes a delimiter (a fixed pattern of bits that identifies the packet as an Ethernet packet), a destination address, a source address and a length field. The payload is the data conveyed by the packet. Ethernet packets generally range from 64 bytes to 1,514 bytes in length. To support virtual LAN tagging, the present system supports up to 1600 byte packets. Ethernet packet structure is defined in IEEE Standard 802.3 and should be well understood in this art. Moreover, the content and size of the Ethernet packets is determined by a higher-order protocol (for example, TCP/IP) at a system upstream from the access point. The higher-order protocol is not critical to the present system and is not described further herein. In the presently described embodiment, the access point need only recognize the packet and determine the packet's destination.

An Ethernet packet transceiver 50 receives packets from Ethernet port 48 and transfers the packets to a buffer memory 52 over a local bus 54. Transceiver 50 is comprised of a physical layer (PHY) component 56 and a media access control (MAC) component 58. In one embodiment, these components are integrated circuits (LAN83C180 and LAN91C110, respectively), available from Standard Microsystems Corporation of Hauppauge, N.Y.

A microprocessor 60 polls transceiver 50 at a rate sufficient to empty buffer 52 faster than the system's maximum data rate, in this example 10 Mbits per second. Upon polling the transceiver, the microprocessor transfers any packets in buffer 52 to a system DRAM 62 over system bus 64. The microprocessor then reads the destination address from the packet header to determine to which user device the packet should ultimately be directed. The access point and subscriber unit microprocessors are programmed in C to perform the functions described herein, although it should be understood that any suitable programming language could be used.

Figure 6:
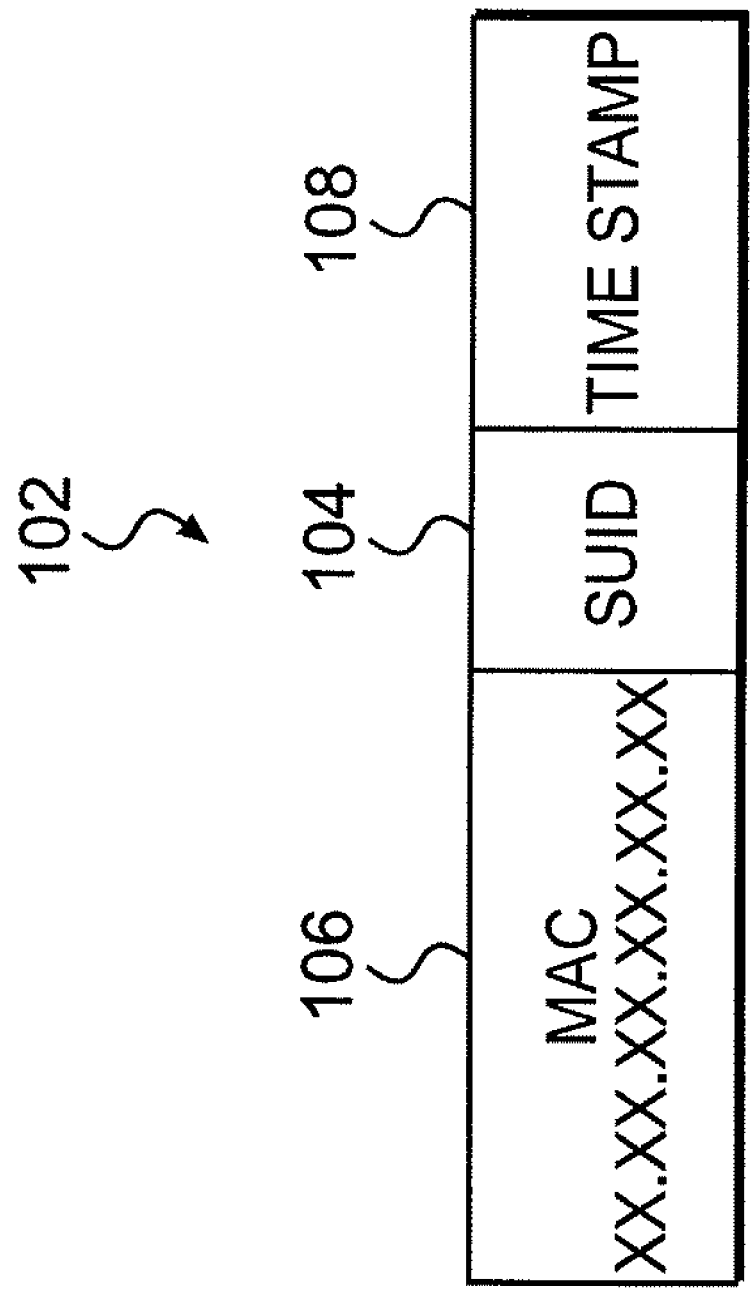
FIG. 6 is a diagrammatic illustration of an address table entry used in accordance with an embodiment of the present invention.

The access point communicates with user devices in its sector via subscriber units. Thus, the access point maintains in a MAC-SU list manager 69 (stored at SDRAM 62) a dynamic table that associates user devices to the respective subscriber units to which they are attached. A single subscriber unit may have multiple computers or other devices attached to it, for example as part of a local network that communicates through the subscriber unit with the Internet or other networks or devices. Thus, and referring also to FIG. 6, the MAC-SU List has multiple entries 102, each of which lists a subscriber unit in the access point's sector (by its subscriber identification number, or SUID, 104) and a MAC address 106 of a user device associated with the subscriber unit. The entry also includes a time stamp 108 corresponding to the time at which the entry was created or updated.

The MAC-SU List is dynamic in that the access point modifies the table's information based on communications managed by the access point. In the presently described embodiment, the access point creates and modifies the table as it receives incoming packets from the local Ethernet port at 47 or the RF transmitter/receiver at 90. For example, assume that a new system is installed with subscriber units and with user devices attached to the subscriber units. Prior to the access point's receipt of any packets for the user devices, the MAC-SU List is empty. It has no entries associating user devices with subscriber units.

Thus, upon receiving the first packet and reading its destination MAC address, the access point microprocessor does not find the packet's destination address in the MAC-SU List and therefore does not know to which subscriber unit to transmit the packet. The access point thus broadcasts the packet to all subscriber units in its sector, which in turn receive the packet and provide it to their user devices. If the target user device is present in the sector and receives the packet, it responds to its subscriber unit, which then forwards the response to the access point.

The subscriber unit sends an Ethernet packet that includes the user device's MAC address appended with the subscriber unit's SUID. In response, and referring again to FIGS. 4 and 5, microprocessor 60 creates at 69 an entry in the MAC-SU List that includes the subscriber unit's SUID 104, the user device's six byte MAC address 106, and time stamp 108 of the time at which the entry was made. If the access point thereafter receives a packet with the same destination address, the microprocessor reads the MAC-SU List entry, identifies the subscriber unit associated with the destination address, and transmits the packet only to the identified subscriber unit. It should be understood that while the presently described embodiment utilizes an SUID number 104 to identify subscriber units in the MAC-SU List, any suitable identification could be used. The access point continues to build the MAC-SU List as it receives packets destined for other user devices.

In the presently described embodiment, the MAC-SU List holds up to 2,000 entries. The microprocessor searches these entries using a blanket search algorithm based on the Ethernet packet's destination address. The search algorithm uses the last byte in the address as an index in which to group the search. That is, the microprocessor reads the destination address and moves to those entries in the MAC-SU List whose user device MAC addresses have the same last byte. The search is then conducted within this index group, as opposed to the entire 2,000-entry table. Within the index group, the microprocessor subsequently reads each user device address until finding the address identified in the Ethernet packet. If the microprocessor finds the desired address, the access point selects the corresponding subscriber unit address in the entry and updates the time stamp.

If the microprocessor does not locate the desired address, the access point designates the packet as requiring broadcast to all subscriber units in the sector, as described above, and creates a new MAC-SU List entry upon receiving a response from the subscriber unit to which the target user device is attached. Thus, the MAC-SU List grows with the number of user devices. When the MAC-SU List is full, and the microprocessor needs to install an additional entry, the microprocessor scans the index group to which the new entry applies, finds and deletes the oldest entry (i.e. the entry with the earliest time stamp) in the group, and enters the new entry. Furthermore, when searching any index group for a subscriber unit, the microprocessor reads the time stamp of each entry and deletes any entry older than a predetermined period, for example five minutes. In this manner, the system constantly updates the MAC-SU List to include those user devices that are currently active. Particularly where the number of entries in the MAC-SU List is greater than or equal to the number of user devices typically active at any given time in the access point's sector, the MAC-SU List facilitates communication with the subscriber units so that the access point may effectively support a much greater number of user devices. Thus, it should be understood that the MAC-SU List may be structured as desired to have a number of entries suitable for a given system. Furthermore, it should also be understood that various search algorithms may be employed in order to locate destination addresses within the MAC-SU List.

Figure 7A:
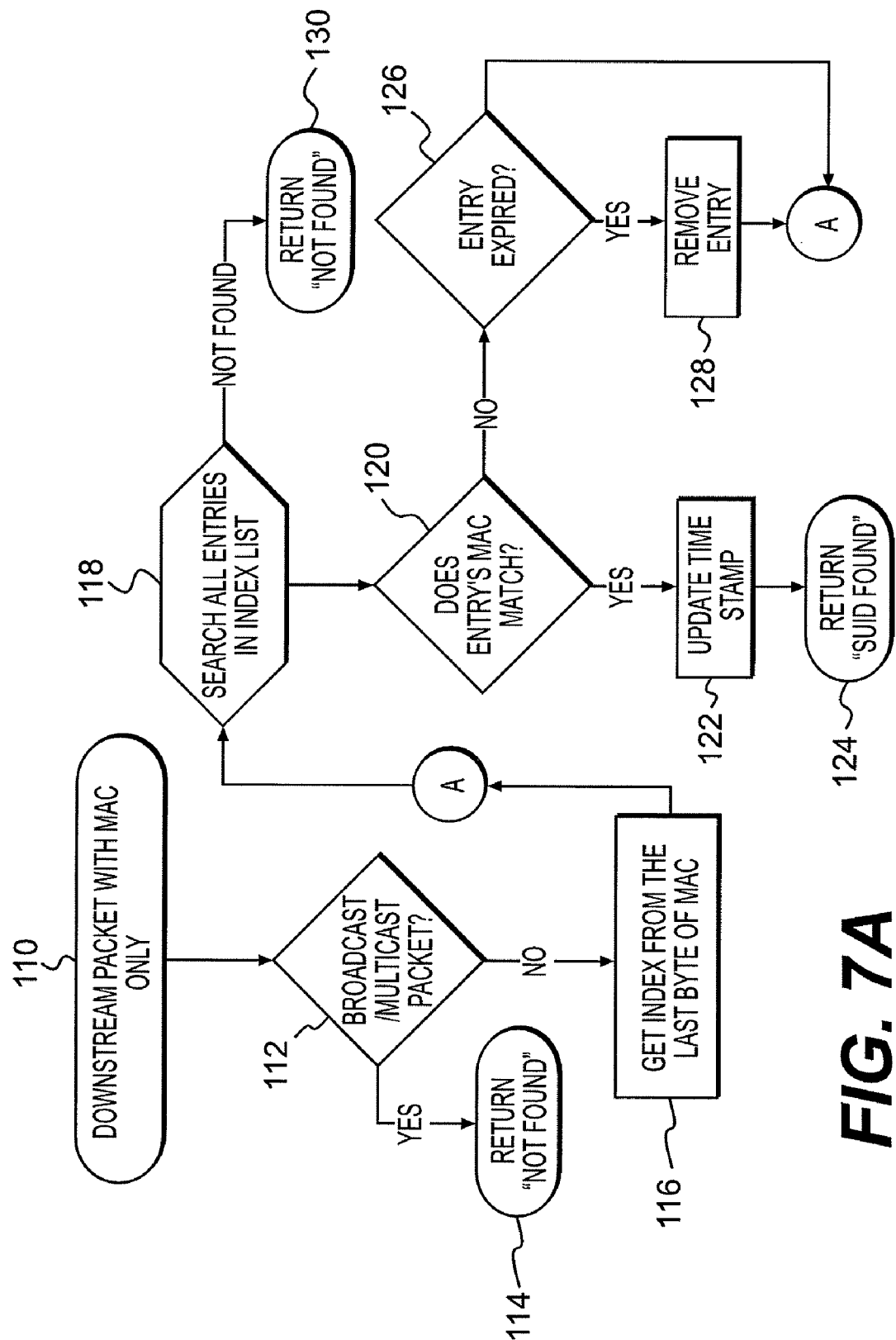
FIG. 7A is a flow diagram of a packet processing procedure in accordance with an embodiment of the present invention.

FIG. 7A illustrates the steps executed by the microprocessor upon receiving a downstream Ethernet packet at 110. The microprocessor first checks at 112 to determine whether the packet is a unicast, broadcast, or multicast packet. Broadcast and multicast packets are described below. Generally, however, these are packets intended for broadcast to all subscriber units, and their destination address field therefore has a special MAC address. If the incoming Ethernet packet's destination field is for broadcast or multicast at 112, the microprocessor determines that there will be no single corresponding subscriber unit in the MAC-SU List and exits the search routine at 114.

If a packet has a MAC address for a user device, the microprocessor reads the last byte of the packet's destination address at 116 and moves at 118 to those entries in the MAC-SU List whose user device MAC addresses 106 have the same last byte. Moving to the first address in this group at 120, the microprocessor compares the destination address with the table MAC address. If they match, the microprocessor updates the time stamp 108 for this entry at 122 and returns the subscriber unit SUID 104 at 124. The microprocessor then knows to which subscriber unit to address the RF data packet as described above.

If the first entry does not have a matching user device MAC address at 120, the microprocessor then checks the entry's time stamp at 126 to determine whether it is older than five minutes. If so, the entry is deleted from the MAC-SU List at 128, and the microprocessor returns to the next entry in the index group at 118. If the time stamp has not expired at 126, the microprocessor moves directly to the next entry in the index group at 118.

This cycle repeats throughout the index group entries until a match is found or until the microprocessor reviews all index group entries without finding a match. If no match is found, the microprocessor exits the search at 130 and broadcasts the packet to all subscriber units, as discussed above.

Figure 7B:
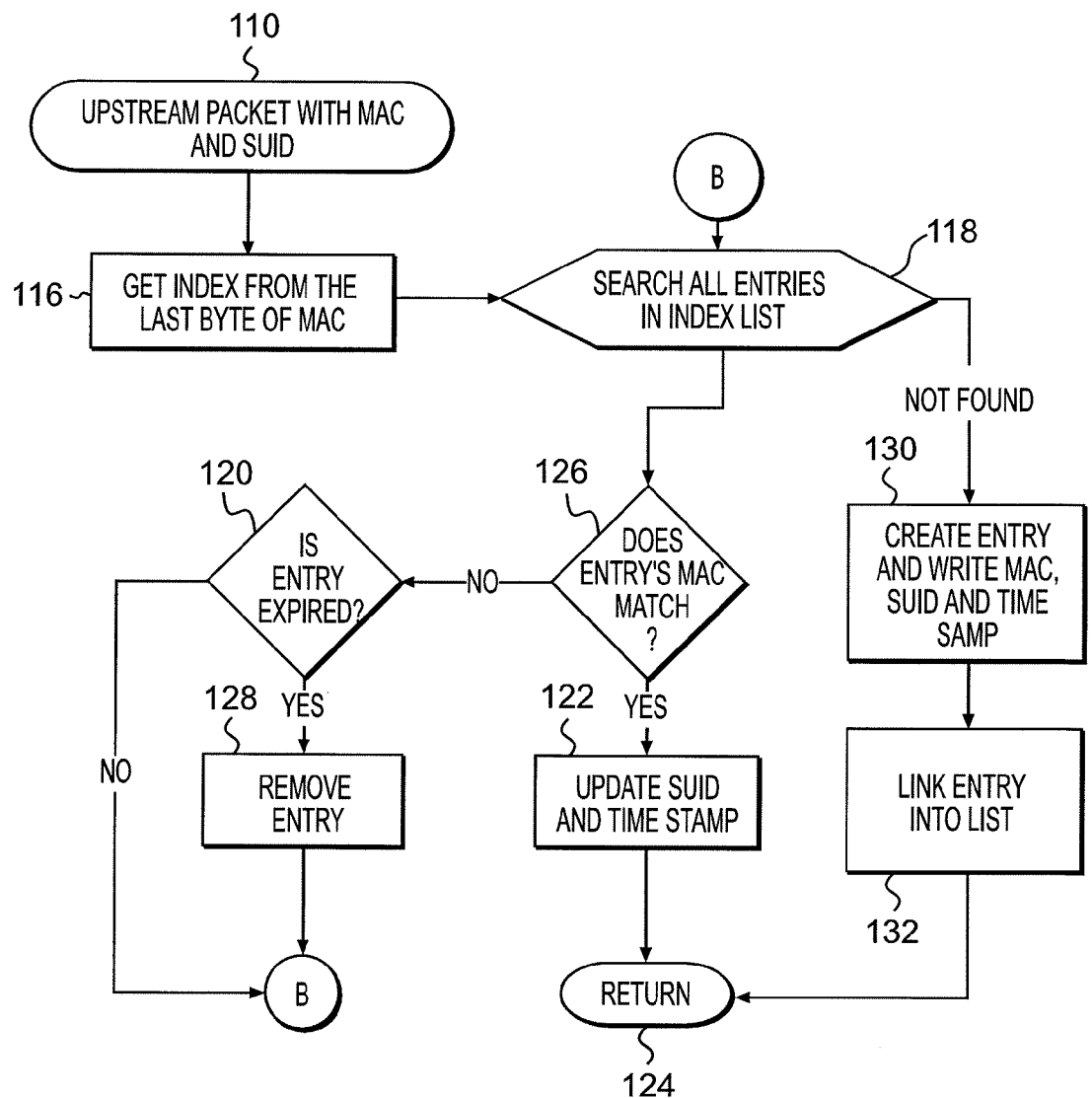
FIG. 7B is a flow diagram of a packet processing procedure in accordance with an embodiment of the present invention.

FIG. 7B illustrates the steps executed by the microprocessor upon receiving an upstream packet at 110. At 116, the microprocessor locates the last byte of the user device MAC address in the packet and moves at 118 to those entries in the MAC-SU List whose user device MAC addresses have the same last byte. The microprocessor executes the search steps 120-128 in the same manner as for downstream packets. After updating the time stamp at 122, the microprocessor proceeds with packet processing at 124. If no match is found in the index group, however, the microprocessor creates a new entry at 130, saves the entry at 132 and proceeds with packet processing at 124.

Returning to FIGS. 4 and 5, when the microprocessor locates the subscriber unit associated in the MAC-SU List with the Ethernet packet's destination address, the microprocessor checks SU database 67 to determine if the subscriber unit is valid. A valid subscriber unit is one whose SUID is stored in the SU database and which the access point has successfully authenticated, as discussed below.

The microprocessor checks at 71 whether the subscriber unit has exceeded its available information rate. In the presently described embodiment, each subscriber unit is assigned a committed information rate (CIR) and a maximum information (MIR). The CIR is the minimum information rate the system is committed to provide the subscriber unit. That is, the subscriber unit will always be allocated this rate or higher. The MIR is the maximum information rate available to the subscriber unit, If the subscriber exceeds its MIR, or if MIR is unavailable when the subscriber unit exceeds its CIR, the system does not permit the subscriber unit to receive or transmit data packets until the subscriber unit's information rate falls back within a permitted level.

The CIR and MIR are established by agreement between the service provider and the subscriber unit customer. For example, a subscriber customer wishing to maintain the availability of 1.5 Mbits/sec is assigned a CIR of 1.5 Mbits/sec. The MIR may be set to 1.5 Mbits or greater, depending on the agreement between the parties. Thus, assuming the system's maximum information rate is 10 Mbits/sec, the MIR may be set anywhere from 1.5 Mbits/sec to 10 Mbits/sec.

If the subscriber unit has exceeded its CIR/MIR at 71, the access point drops the incoming Ethernet data packet. This typically does not result in information loss, as the originating device typically re-sends the packet. Processes for monitoring a subscriber unit's information rate and for comparing the information rate with CIR/MIR limits are discussed in detail below.

If the subscriber unit has not exceeded its CIR/MIR at 71, the microprocessor places the incoming Ethernet packet in a first-in-first-out buffer 73. When the packet passes through the buffer, the microprocessor constructs a radio frequency packet at 75 that will convey the Ethernet packet to the subscriber unit. An exemplary RF data packet structure is described in detail below. Briefly, however, and referring also to FIGS. 18A and 18B, an RF data packet 66 is comprised of a payload section 68, a MAC data packet header 70 and an RF preamble and header 72. The microprocessor forms payload section 68 and MAC data packet header 70. A baseband processor 74 later forms RF preamble and header 72

Payload section 68 is the entire Ethernet packet. MAC data packet header 70 includes information used for routing and system management. It also includes the SUID of a subscriber unit in the access point's sector that will next be allowed to transmit back to the access point. The microprocessor selects this subscriber unit through a polling algorithm at 76. The polling algorithm is described in detail below.

Upon forming the MAC data packet header, the microprocessor sends the header and the payload to a field programmable gate array (FPGA) 78 over system bus 64. FPGA 78 includes parallel-to-serial conversion logic that converts parallel data from system bus 64 into a FIFO buffer 80 for serial output to baseband processor 74. The FPGA also includes transmit/control logic that controls operation of the baseband processor based on the reception of packets by the FPGA. The FPGA initiates transmit mode in the baseband processor and transmits packets to the baseband processor at a time coordinated by the baseband processor.

Preferably, the baseband processor scrambles the MAC payload 68 and data packet header 70. It then adds RF preamble and header 72 to the two MAC packet portions. The RF header provides information that, once the packet is transmitted by the access point intermediate frequency (IF) modem 82, to enable the receiving subscriber unit's IF modem (not shown) to align its clock so that the packet's payload is properly received. That is, the present system initializes the transmission for each packet. A suitable baseband processor/IF modem pair is available from Intersil Corporation of Irvine, Calif. (model numbers HFA 3783 and HFA 3861B, respectively). It should be understood that various transmission techniques and arrangements may be utilized within the present invention. Such methods should be understood in this art and are, therefore, not discussed in further detail herein.

Baseband processor 74 converts the resulting RF packet into filtered I and Q datastreams 84 and 86 in sending the packet to IF modem 82. Modem 82 then modulates the I and Q datastreams onto an IF frequency and transmits the packet to a half-duplex RF transceiver 88 at 90 over either of a horizontally-polarized antenna array 42 or a vertically-polarized antenna array 44. Since the RF packet is phase-modulated onto a carrier signal, the I (in-phase) and Q (quadrature) signals provide angle information by which modem 82 effects the modulation, as should be well understood.

In the embodiment described herein, IF modem 82 operates at a frequency of approximately 480 mHz. Transceiver 88 upconverts the signal to the system's 5.8 GHz operational frequency. As indicated above, the access point's operational frequency may be one of a plurality of channels within a range assigned by the Federal Communications Commission. The present invention is not limited to frequency range and may operate within any suitable wireless environment.

Transceiver 88 transmits the RF preamble and header portion of the RF data packet from antenna array 42 or 44 at one Mbit/sec BPSK and transmits the MAC header and payload at eleven Mbits/sec QPSK. The lower data rate of the RF header facilitates the signal's capture by the receiver's baseband processor in noisy environments. Once the baseband processor sets the clock for reception of the remainder of the packet, the higher information rate for that portion of the packet facilitates transmission speed.

The access point may transmit data packets or command packets. A command packet has a structure similar to a data packet in that it has an RF preamble and header, a scrambled packet header and a scrambled payload. Rather than data destined for a user device, however, the command packet includes instructions for subscriber units for use in managing the system. A more detailed example of command and data packet structures is provided below.

Regardless whether a packet transmitted by the access point is a command packet or a data packet, the packet's MAC header includes a transmit grant, i.e. the SUID of the subscriber unit that next has permission to transmit to the access point. For example, assume the access point receives an Ethernet data packet destined for a user device attached to a subscriber unit A. Assume also that, according to the polling algorithm, a subscriber unit B is next eligible to transmit to the access point. The access point creates an RF data packet within which to transmit the data packet to subscriber unit A. Within the MAC header of this data packet, the access point microprocessor inserts the SUID of subscriber unit B into the transmit grant field. When transceiver 88 broadcasts the RF data packet, all subscriber units in the access point's sector monitor the transmission. Subscriber unit A, recognizing from the packet header that the payload in the data packet is intended for a user device attached to it, directs the packet to the intended device. Subscriber unit B, although ignoring the payload, detects the transmit grant in the data packet header and prepares to transmit to the access point.

A subscriber unit does not transmit to the access point unless it receives a transmit grant. Thus, the access point only looks for a subscriber unit transmission during a period of time immediately after the access point transmits a packet. This wait period is related to the distance between the access point and the subscriber unit and to the processing time needed by the subscriber unit to receive the transmit grant and to generate and transmit a responsive packet. For example, a packet takes approximately 100 microseconds to travel round trip between a subscriber unit and an access point that are ten miles apart. Assuming that the delay created by processing within the subscriber unit ranges from 200 to 300 microseconds, the access point may preferably wait at least 400 microseconds after issuing the transmit grant to receive a response from the subscriber unit.

Accordingly, following transmission of a data packet containing a transmit grant, each access point waits to receive a response from the identified subscriber unit for a period of time based upon the distance between the access point and the farthest possible subscriber unit. The access point is programmed for a maximum range within which subscriber units will be disposed. The wait time is programmed into the access point based on the furthest distance in this range. Thus, for example, where the maximum range from the access point is 10 miles, the wait time may be set to 425 microseconds. Alternatively, the access point may dynamically set the wait time based on actual distances between the subscriber units and the access point, changing the wait time as needed when new subscriber units are added in the sector and ranged by the access point as described below.

If each subscriber unit is programmed so that response to a transmit grant takes precedence over all other activities, each subscriber unit can be expected to consistently respond to an access point transmit grant at the same period of time. Thus, if a subscriber unit responds at a different time, this may indicate that the subscriber unit has moved and is in need of re-authentication. Thus, the access point may provide a notice of the change to the system administrator and, optionally, end all further communication with the subscriber unit until its re-authentication.

The access point switches over to receive mode during the wait period following a packet transmission. In receive mode, antennas 42 and 44 are linked to amplifiers in transceiver 88 at 90. The transceiver antennas down-convert the signal received by the antennas from a subscriber unit to the IF frequency for IF modem 82. Modem 82 receives the signal and passes its I and Q components 96 and 97 to baseband processor 74. If the signal's energy level is above a predetermined threshold programmed into the baseband processor (e.g. within a range of −80 dBm to −60 dBm), the baseband processor initiates an automatic gain control loop with the IF modem to bring the IF signal into an acceptable voltage range for demodulation.

The baseband processor receives and decodes the preamble and header from the RF packet received from the subscriber unit, recovers the clock and aligns itself to receive the MAC data packet header and payload. The baseband processor de-maps the MAC data packet from I and Q symbols to bit patterns. Similarly to RF packets sent by the access point, MAC data packets originating from the subscriber units are scrambled. The baseband processor de-scrambles the MAC data packet and clocks the data packet out to FPGA 78 over a synchronous serial port. The FPGA converts the serial data to parallel, stores the parallel data in FIFO buffer 98 and notifies microprocessor 60 that data has arrived. Microprocessor 60 retrieves the data from the FPGA over system bus 64 and parses the original Ethernet packet from the MAC data packet. As described in more detail below, and similarly to MAC data packets built by the access point, the MAC data packet from the subscriber unit is comprised of a header and a payload, the payload being an Ethernet packet if the packet is ultimately destined for an Ethernet system. The microprocessor updates the MAC-SU List (as described above with respect to FIG. 7B) at 69, updates the subscriber unit's throughput usage at 71 and forwards the Ethernet packet across system bus 64 to Ethernet transceiver 58 and out through Ethernet port 48 to Ethernet switch 46 (FIG. 3) at 100.

The preceding discussion assumes that the subscriber unit responds to a transmit grant from the access point with a data packet. The subscriber unit responds to the transmit grant, however, whether or not the subscriber unit has anything to send. If it has no outgoing data, the subscriber unit responds with an RF packet enclosing a command packet that returns the time stamp sent in the access point data packet. This notifies the access point of the subscriber unit's continued existence and operation in the system and allows the access point to operate according to the polling algorithm discussed below.

Figure 5:
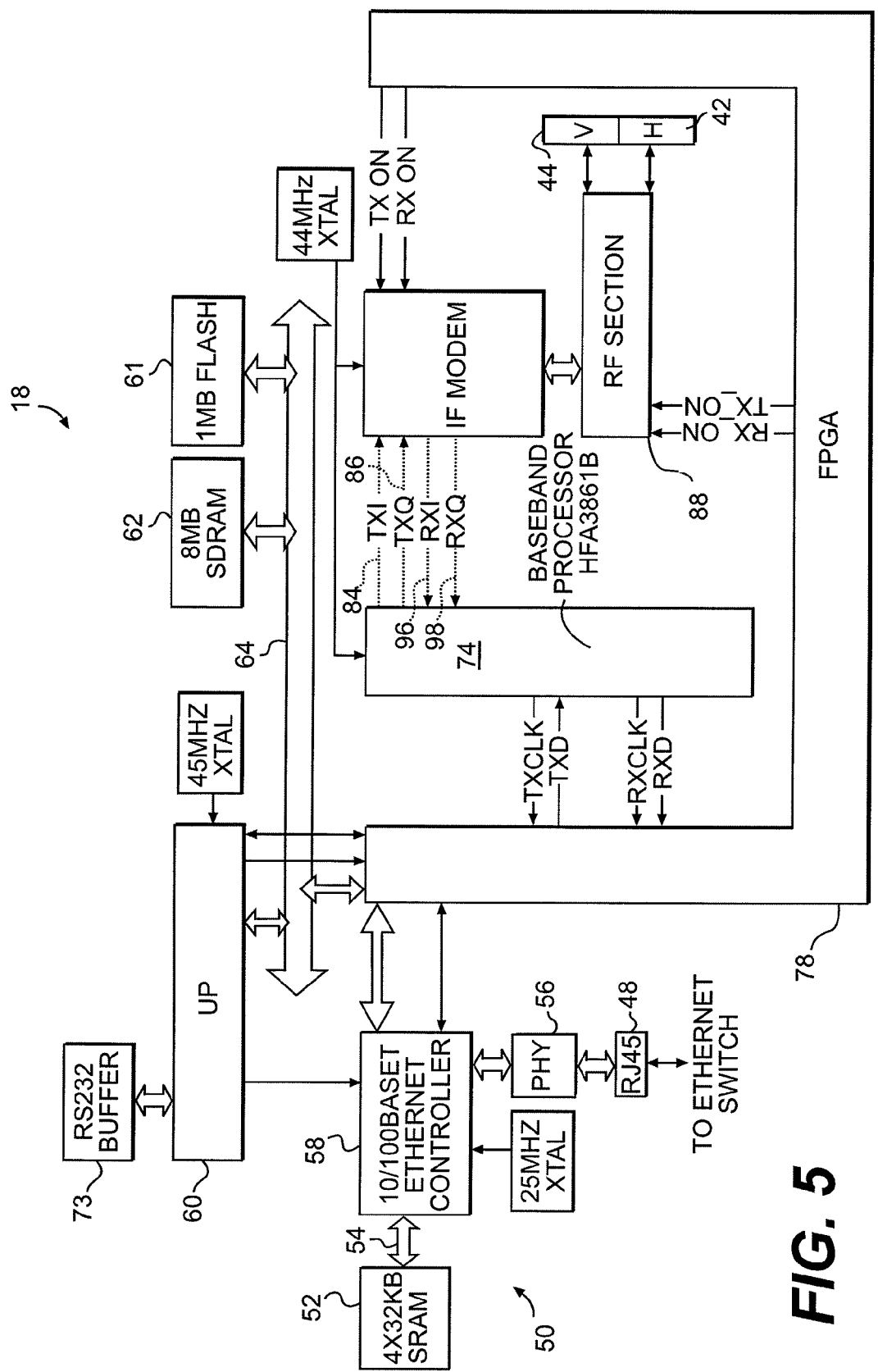
FIG. 5 is a circuit block diagram of the transmitter and receiver as shown in FIG. 4.
Figure 8:
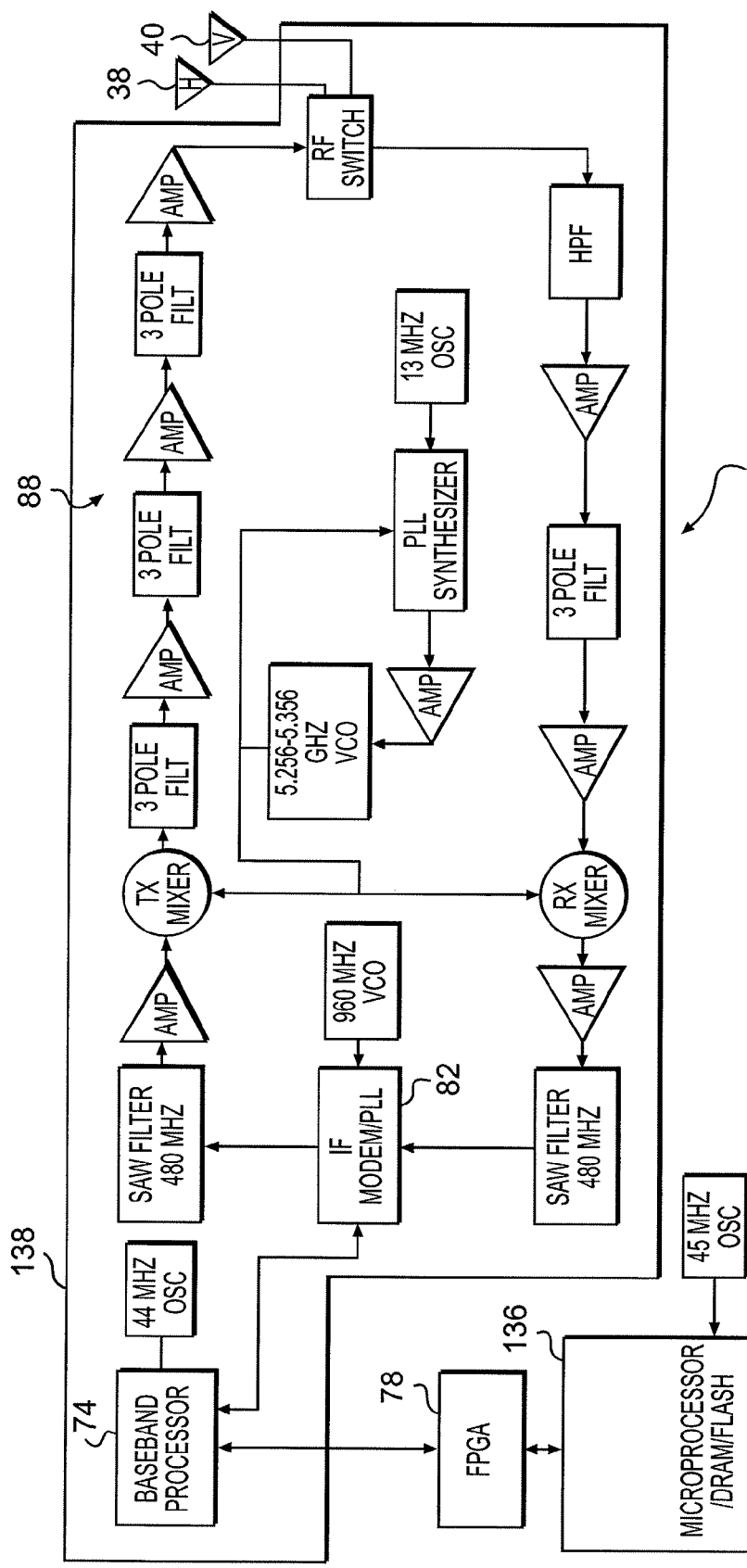
FIG. 8 is a functional block diagram illustration of a subscriber unit transmitter and receiver in accordance with an embodiment of the present invention.

As noted above, and referring now to the functional diagram provided in FIG. 8, the subscriber unit architecture is similar to the access point architecture shown in FIG. 5. A microprocessor subsystem 136 is shown as a single block with a microprocessor, DRAM and flash memory, but it should be understood that this is a functional representation and that these components are discrete devices, as shown in FIG. 5. Accordingly, references below to "microprocessor 136" should be understood to refer to the microprocessor within the subsystem. Similarly, Ethernet transceiver 56 is comprised of a physical layer component and a media access component.

Subscriber units may also be protected by shielding, indicated at 138 in FIG. 8. Baseband processor 74 and modem 82 are protected by shielding 138, as are the components of transceiver 88, which are shown in functional block diagram form. The subscriber unit transceiver's architecture is the same as that of the access point transceiver.

When a user device attached to a subscriber unit attempts to communicate with the Internet through the present system, the user device outputs a variable length Ethernet packet to the subscriber unit through the local area network or direct Ethernet connection established between the user device and the subscriber unit. The Ethernet packets are received by microprocessor 136 from the Ethernet port. Microprocessor 136 transfers the packets to the internal system DRAM and then forms a MAC data packet in a manner similar to that described above with respect to the access point. The format of the MAC data packets created by the subscriber unit is different from that of data packets created by the access point. These differences are discussed in more detail below.

Microprocessor 136 sends the MAC data packet to FPGA 78. The FPGA directs the parallel data packet into a FIFO buffer for serial output.

When the subscriber unit detects a transmission from the access point with the subscriber unit's SUID as the transmit grant, the microprocessor activates the path to baseband processor 74 and outputs the serialized MAC data packet to the baseband processor over a synchronous serial port. The baseband processor scrambles the MAC data packet, adds the RF preamble and header control bytes, converts the resulting RF data packet into filtered I and Q data streams and sends the data to modem 82. The modem then modulates the I and Q data streams onto an IF frequency. The RF transceiver up-converts the modulated IF frequency to the transmission frequency and transmits the data through antenna 38 or 40. Similarly to the access point, the subscriber unit may transmit data packets or command packets.

When receiving a transmission from the access point, the subscriber unit's RF transceiver detects energy on antenna 38 or 40. The transceiver converts the signal's frequency to the IF frequency and outputs I and Q data streams to baseband processor 74. If the energy level of these signals is above a predetermined threshold, the baseband processor initiates an automatic gain control loop with modem 82 to bring the IF signal into an acceptable voltage range for demodulation.

The baseband processor first decodes the preamble and header to recover the clock, thereby aligning the baseband processor with the incoming transmission. Similarly to the access point's baseband processor, the subscriber unit baseband processor then decodes the MAC data packet and sends the resulting signal over a synchronous serial port to FPGA 78. The FPGA converts the serial data to parallel, stores the resulting signal in a FIFO buffer, and notifies microprocessor 136 of the signal's arrival. The microprocessor then retrieves the MAC data packet from the FPGA over a system bus and parses out the original Ethernet packet. Because the payload is an Ethernet packet, the microprocessor outputs the packet through the Ethernet port (not shown) to the downstream Ethernet system that directs the packet to the destination identified in the Ethernet packet header.

Where the unscrambled MAC packet header indicates that the packet is a command packet, microprocessor 136 does not forward the packet to a downstream device but, instead, responds to the instructions in the command packet.

B. Polling Procedure

Returning to operation of the access point, transmission bandwidth is allocated to the subscriber units based on the subscriber units' use of data bandwidth. Initially, the term "bandwidth" is used elsewhere herein to refer to a frequency range over which the access point and its subscriber units communicate. As used here, however, "data bandwidth" refers to the opportunity to communicate over all or part of that frequency range. For example, "data bandwidth" may refer to net data throughput per subscriber in Mbit/sec. The maximum data throughput capability of the system, in this case 10 Mbit/sec, is divided among all the subscribers in the sector according to a set of rules by giving each subscriber a portion of a fixed, periodic time interval (one second, for example) to use the radio frequency channel to receive or transmit payload data. Thus, the description in the present example discussed herein of the access point allocating transmit or receive data bandwidth to the subscriber units refers to allocation of data throughput.

In the present example, the access point microprocessor selects the next subscriber unit to which to assign a transmit grant based on a polling algorithm designed to reduce system latency for typical traffic patterns in a multi-user networking environment. Very generally, latency may be considered the delay in communications arising from the operation of the access point and subscriber units. That is, and referring to FIG. 3, if a baseline time is considered to be the time required for communication between Ethernet switch 46 and user device 34 over a hard wire connection, system latency is the difference between the baseline time and the time required for communication between those points through access point 18 and subscriber unit 22. In the present example, very little latency is introduced in communications from the access point to the subscriber units, since the access point simply passes incoming Ethernet packets to their desired destinations as they arrive, subject to CIR/MIR limitation.

Upstream traffic, however, requires a different type of decision regarding which communications will be permitted at a given time. For example, an access point may define a designated period of time, or "contention" period, following downstream transmissions in which subscriber units may transmit. During the contention period, the access point moves into receive mode for receipt of a transmission from a subscriber unit. In the present embodiment, however, the access point selects the order in which subscriber units may transmit without the use of a contention period. Thus, the primary source of latency for upstream traffic is the period between transmit grants assigned by the access point.

The polling algorithm defines the order in which subscriber units are selected for a transmit grant. Priority in the polling algorithm may be assigned on a constant basis through agreement between the subscriber unit operator and the service provider. For such subscriber units, the polling algorithm assigns priority regardless of the subscriber units' need to transmit. Outside this group, however, a subscriber unit's transmit priority increases or decreases based on how frequently the subscriber unit uses the system. This allocates bandwidth to subscriber units more likely to need bandwidth without wasting time monitoring lesser active subscriber units, thereby improving the latency that the more-active subscriber units might otherwise experience.

The system defines bandwidth priority in part through timers assigned to the subscriber units. In the present example, timers are assigned to the subscriber units in groups that are utilized by the polling algorithm to allocate transmit grants. The groups are maintained in memory at the access point. The access point maintains a list of subscriber unit SUIDs associated with each polling group, and the access point microprocessor dynamically assigns subscriber units to the different groups based at least in part on data demand. The groups contain other information as discussed below.

Figure 9:
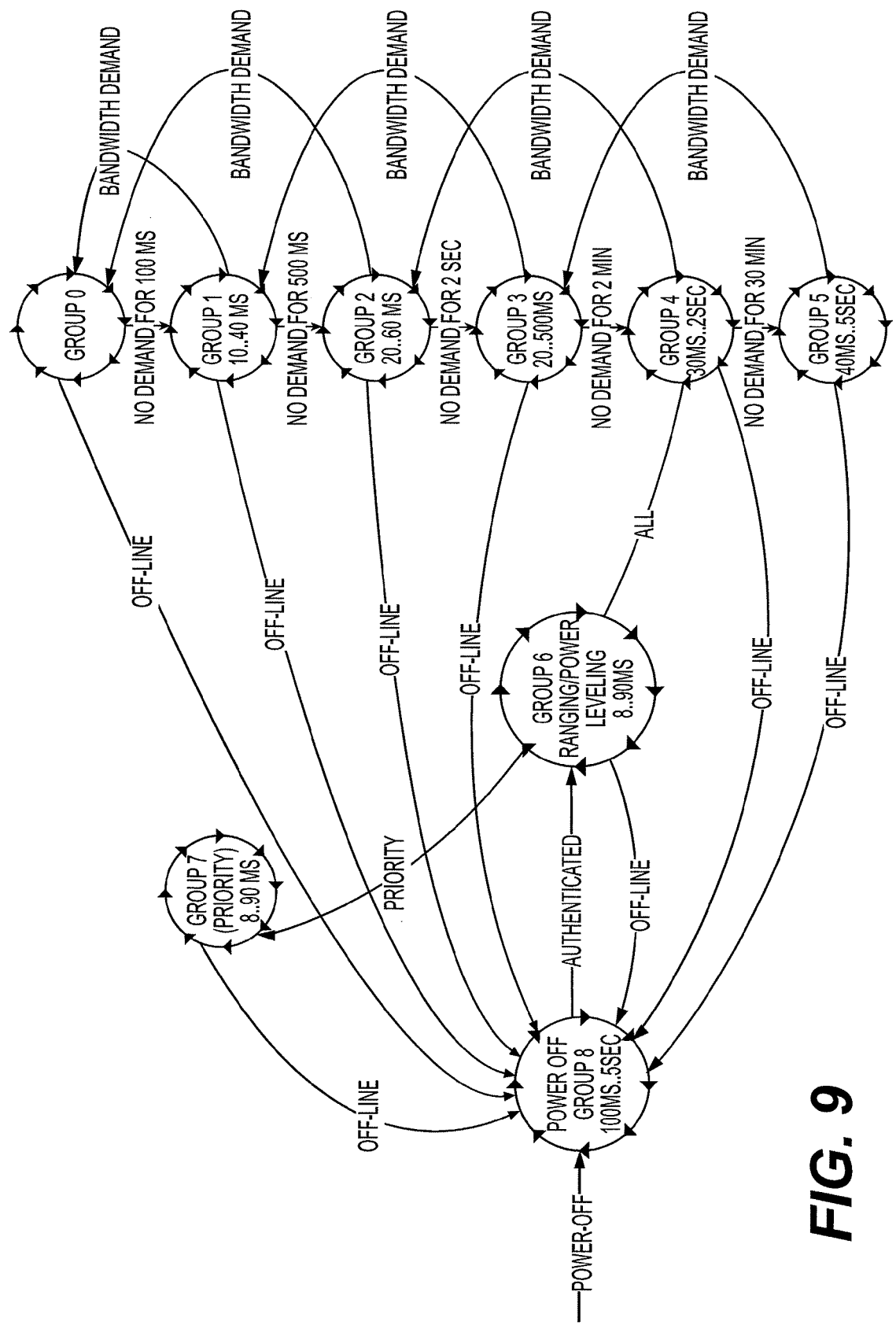
FIG. 9 is a group flow diagram illustration within a polling algorithm according to an embodiment of the present invention.

Referring to FIG. 9, the polling timer for each polling group, except group zero, has an expiration period that varies with the number of subscriber units in the group. As described in more detail below, the access point microprocessor repeatedly checks the timer of each group to determine whether any action should be taken with the subscriber units in the group. Thus, in general, the length of a timer's expiration period is inversely related to the preference the group receives from the microprocessor. That is, the microprocessor deals more frequently with subscriber units in groups having shorter polling timers than those with longer timers.

Timer length varies with the number of subscriber units in the group. When the microprocessor polls a group, it will act only on one subscriber unit in the group before moving to the next group. Thus, as each additional subscriber unit is added to the group, the timer length is reduced so that the latency experienced by each individual subscriber unit is approximately the same as if it were the only subscriber unit in the group.

Referring to group two in FIG. 9, for example, the group's initial timer length is 60 ms. This will be the timer length if there are zero or one subscriber units in the group. In this case, the microprocessor polls group two no more than once every 60 ms. If group two includes two subscriber units, the timer length changes to 40 ms. While the microprocessor now polls group two more frequently, the existence of two subscriber units in the group means that the microprocessor acts on an individual subscriber unit in the group only every other poll. Thus, from the perspective of a given subscriber unit, the polling frequency goes to 80 ms from 60 ms.

The initial timer length ($T_{max}$) is the maximum timer length a group experiences. There is also, however, a minimum timer length ($T_{min}$). Regardless how many subscriber units are contained in group two, for example, the actual timer length ($T_{poll}$) does not drop below 20 ms. $T_{poll}$ varies according to rules based on the number of subscriber units (NS) in the group. For groups one through six and eight, if NS is less than 127, then $$T_{poll} = (T_{max} - T_{min})/(NS) + T_{min}.$$

If NS is greater than or equal to 127, then $$T_{poll} = T_{min}.$$

For group seven, if NS is less than 11, and if $T_{min}$ is less than or equal to $(T_{max})/(NS)$, then $$T_{poll} = (T_{max})/(NS).$$

If NS is less than 11, and if $T_{min}$ is greater than $(T_{max})/(NS)$, then $$T_{poll} = T_{min}$$

If NS is greater than or equal to 11, then $$T_{poll} = T_{min}.$$

Accordingly, with zero or one subscriber units, timer length is at its maximum level assigned to the group. As subscriber units are added, timer length decreases until reaching the timer length minimum. Regardless how many subscriber units are thereafter added to the group, timer length remains the same.

The microprocessor also controls placement of subscriber units in the various groups. With the exception of subscriber units assigned to group seven, a subscriber unit can belong to only one group at a time. Group seven is a fixed latency polling group. By agreement with the service provider, these subscribers may be guaranteed at least a minimum latency—i.e., at least a minimum subscriber unit polling period when the number of subscriber units in the group is less than eleven. Any subscriber unit covered by such an agreement is placed in group seven following its authentication in the system and remains there as long as it remains active. These subscriber units, along with all other subscriber units, also enter the polling sequence comprising groups zero through five.

Figure 10:
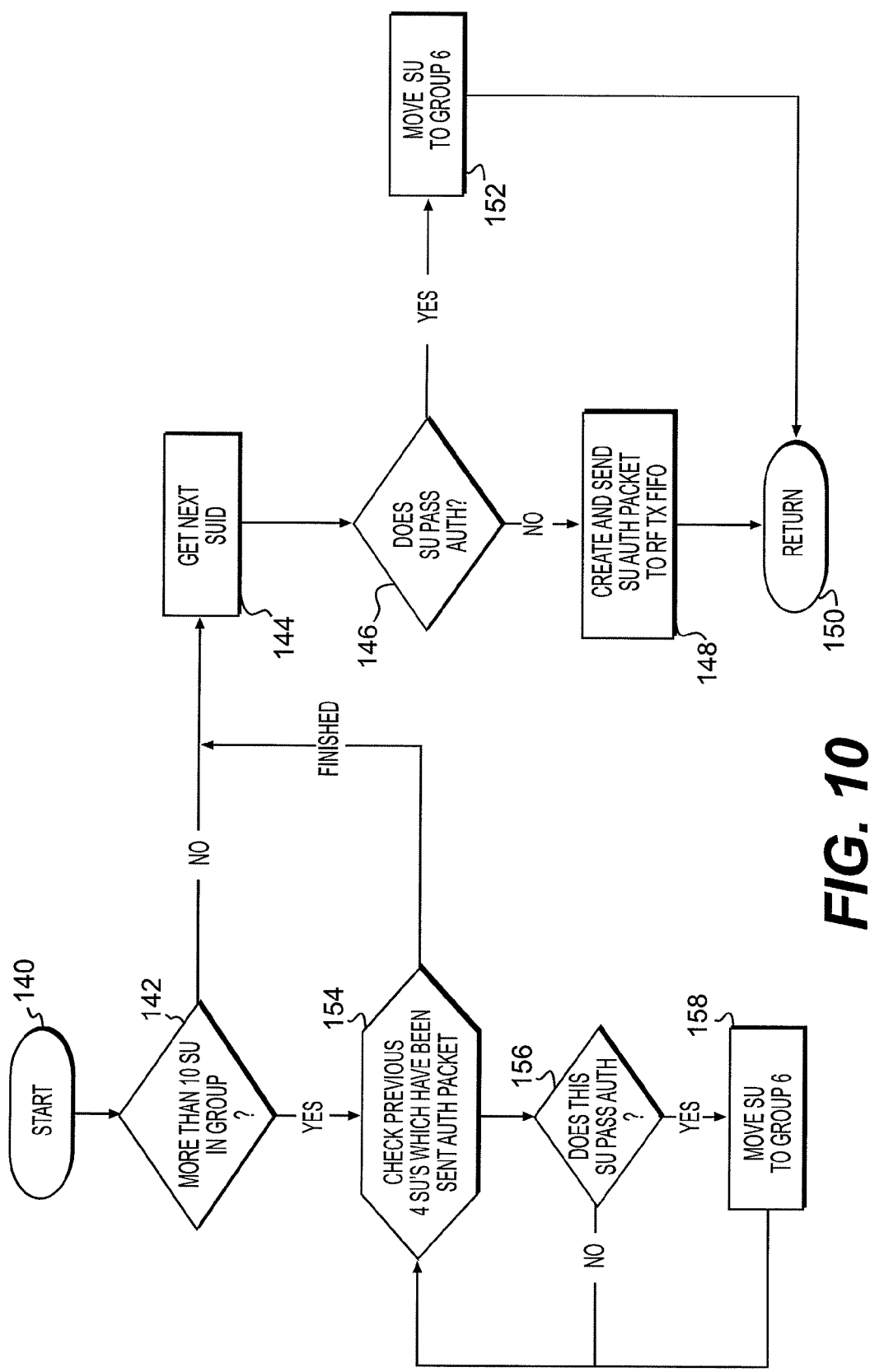
FIG. 10 is a flow diagram of part of a polling algorithm in accordance with an embodiment of the present invention.

At system start-up, all subscriber units reside in group eight. As indicated in FIG. 9, the microprocessor polls group eight every five seconds, or up to every 100 milliseconds, depending on the number of subscriber units in the group. Referring also to FIG. 10, when the microprocessor polls group eight at 140, it first checks at 142 whether the table for group eight has more than ten subscriber units. If not, the microprocessor moves a pointer at 144 to the next subscriber unit in the list and checks at 146 whether the subscriber unit has yet been authenticated.

Authentication is the recognition by the access point that the subscriber unit exists and is operating in the access point's sector. When the subscriber unit is installed in the sector, the system operator makes an entry for the subscriber unit in the static subscriber unit database stored in the access point's flash memory 61 (FIG. 5). For each subscriber unit, the operator enters an SUID (e.g., a number assigned by the operator), the subscriber unit's MAC address, the subscriber unit's attribute (i.e., whether it is a priority or regular subscriber unit for polling purposes) and the subscriber unit's rated CIR and MIR. The access point uses the stored database to initialize a dynamic database that is updated during the system's operation. The dynamic database includes the data for the various tables described herein. Thus, for example, the various group tables are lists of SUID's that point to data in the dynamic database.

When the subscriber unit is entered in the database, the microprocessor adds the subscriber unit to the group eight list. At this point, the subscriber unit is not authenticated, since it has not received and responded to an authentication packet from the access point. Thus, when the microprocessor examines the entry for the subscriber unit in the group eight table at 146, it sees that the subscriber unit has not been authenticated, and, at 148, creates an authentication request command packet requesting the SU with an SUID matching the SUID in the transmit grant field to reply with it's hard-coded Ethernet MAC address. The packet goes into FIFO buffer 80 (FIG. 4) for transmission, and the microprocessor exits the group eight routine at 150 to the next step in the polling algorithm.

After the access point transmits the command packet, it should receive in the following wait period a return command packet from the subscriber unit with a payload carrying the subscriber unit's MAC address. If this matches a MAC address stored in the access point's SU database for that SUID, the microprocessor updates the entry for that subscriber in the group eight table to indicate the subscriber unit has been authorized. If the subscriber unit is authenticated at 148, the microprocessor moves the subscriber unit to group six at 152.

The microprocessor leaves the software pointer at the subscriber unit at steps 148 and 152. When the microprocessor returns to group eight in the polling algorithm, the microprocessor examines the next subscriber unit at 146.

Group eight contains not only new subscriber units, but also existing subscriber units that fail to respond to a transmit grant. That is, group eight holds all subscriber units that have been entered in the access point database but that are inactive or not yet authenticated. Accordingly, particularly when multiple subscriber units go off-line, it is possible that group eight may contain several subscriber units. Thus, if group eight contains more than ten subscriber units in its list at 142, the microprocessor scans the group eight list and selects at 154 the four subscriber units that have most recently been sent authentication packets.

Examining the entry in the group eight list for the previous four subscriber units, the microprocessor checks the entry at 156 to see if the subscriber unit responded with a valid MAC address. If so, the microprocessor moves the subscriber unit to group six at 158 and moves to the next of the four subscriber units at 154. If the subscriber unit has not responded to the authorization packet at 156, the microprocessor moves to the next of the four subscriber units at 154. A temporary pointer is used to move through the four subscriber units and is deleted upon completion of the search.

Returning to FIG. 9, group six is an intermediate position between group eight and the data polling groups, i.e. groups seven and groups zero through five. Prior to forwarding the subscriber units to the data polling groups, the access point confirms their range and RF signal power level through command packets sent to the subscriber units. The command packet includes a time stamp applied by the access point, the desired subscriber unit's SUID as the transmit grant, and a power level change instruction. The subscriber units are programmed to immediately respond to this request. Thus, during the access point's following wait period, the subscriber unit responds with a command packet echoing the access point's time stamp. By comparing the time stamp with the time at which the access point receives the return packet, the access point microprocessor determines the distance between the access point and the subscriber unit. If the power level change instruction is non-zero, the subscriber unit adjusts its output power according to the instruction.

Generally, the ranging/power leveling process is comprised of five cycles of six ranging/power leveling packets sent by the access point to a subscriber unit. Within each cycle, the access point determines the range and power level of each response from the subscriber unit and determines the maximum calculated range and the maximum power level measured at the access point for the six responses. In the last packet in each cycle, the access point issues a power level change command to incrementally increase and decrease, as appropriate, the subscriber unit's output power level toward a desired level.

As shown in FIG. 9, the access point microprocessor polls group six at most once every 90 ms if there are zero or one subscriber units in the group. The microprocessor polls the group more frequently if there are more subscriber units, to a minimum rate of once every 8 ms.

Figure 11:
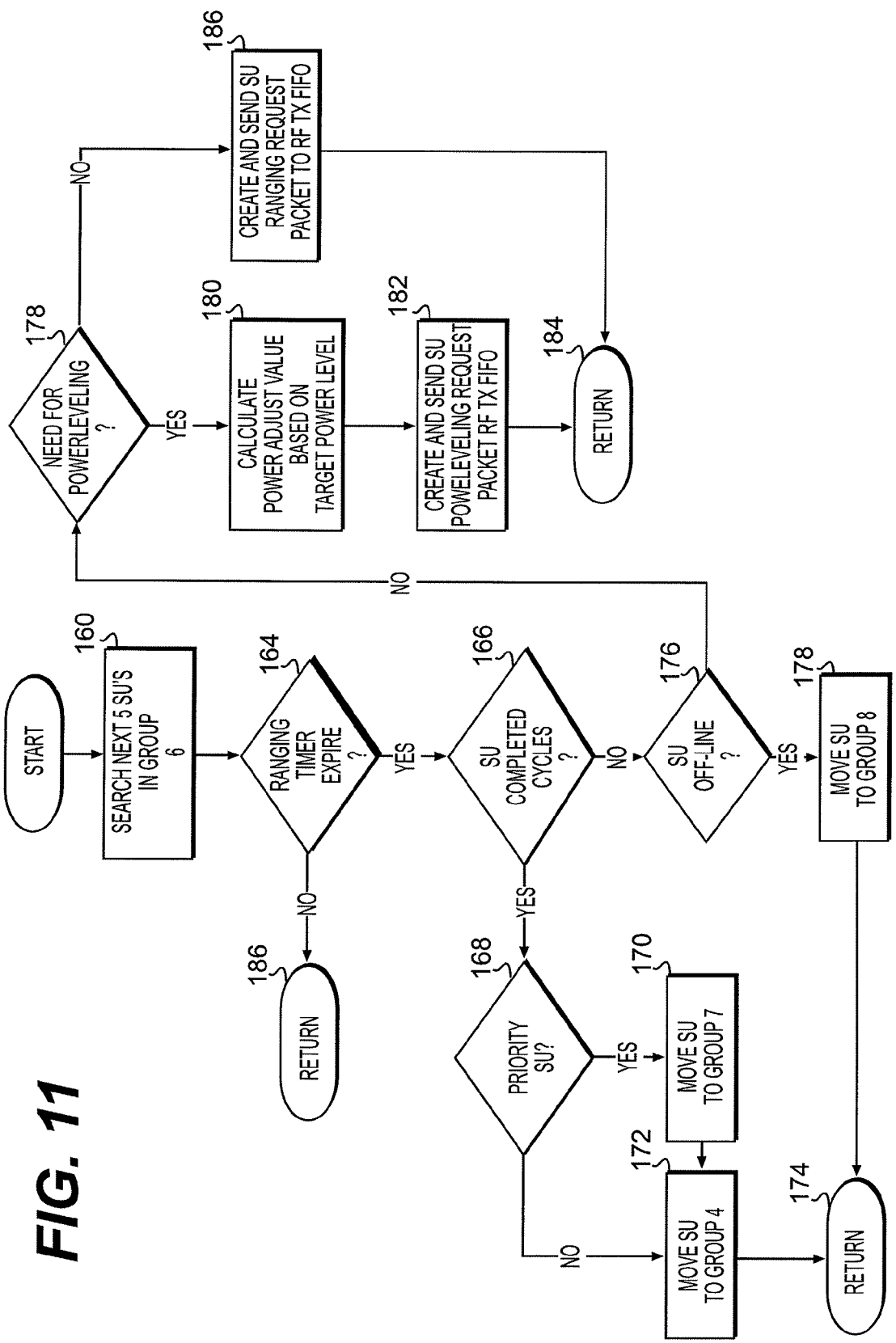
FIG. 11 is a flow diagram of part of a polling algorithm in accordance with an embodiment of the present invention.

FIG. 11 illustrates the procedure executed by the microprocessor in polling group six. As with group eight, group six is defined as a list of subscriber units in memory. The list includes the SUID for each subscriber unit, the maximum power level measured by the baseband processor from all past power leveling responses received from the subscriber unit during the present six-request cycle, the power level of the last response in the cycle, the minimum average and maximum ranges determined in the cycle, and the last range determined in the cycle. Each entry also includes a ranging/power leveling timer (a time stamp of last ranging or power leveling response plus a fixed interval, for example 100 ms, at which the timer will expire).

At 160, the microprocessor moves sequentially through the next five subscriber units in the list of subscriber units in group six, examining the ranging/power leveling timers of each. The access point checks each timer value to determine if it has expired (i.e., if it is older than the current time). If none of the subscriber unit timers has expired at 164, the microprocessor exits the group six poll at 186. If the microprocessor finds a subscriber unit among the five under examination at 164 for which the timer has expired, the microprocessor places a pointer at the subscriber unit and checks at 166 to see if the subscriber unit has completed all five ranging/power leveling cycles. If so, then power leveling is complete for this subscriber unit, and the microprocessor checks at 168 to determine whether the subscriber unit is a priority subscriber pursuant to an agreement with the service provider. If so, the microprocessor assigns the subscriber unit to group seven at 170 and to group four at 172. That is, as described above, the subscriber unit is placed both in the priority group seven and in the variable groups zero through five. The microprocessor then moves the pointer to the next subscriber unit and exits the group six poll at 174.

If the microprocessor has not yet completed the ranging/power leveling cycles at 166, the access point checks a "ping response" timer for the subscriber unit at 176. This timer, which is discussed below, provides an indication whether the subscriber unit has responded to previous packets sent by the access point. If the subscriber unit has failed to respond, or has responded beyond a certain time limit so that it may be considered off-line, the microprocessor moves the subscriber unit back to group eight at 177 and exits the group six poll at 174.

If the subscriber unit responds to the poll at 176, the microprocessor checks at 178 to see if the subscriber unit is at the end of a six-request cycle. If not, the access point creates a ranging request packet at 186 and sends the packet to the subscriber unit. As the packet is for a range request, the power leveling change instruction is zero. The access point leaves the database pointer on this subscriber unit and exits the group six poll at 184.

When the access point receives a packet from the subscriber unit in response to the ranging packet sent by the access point at 186, the access point updates the time stamp for the subscriber unit's ranging/power leveling timer and stores the range calculated from the response packet's time stamp. If the received power level is greater than the current power level value, the access point also stores the received power level as the subscriber unit's power level value.

Because the pointer remains at the same subscriber unit, it is the first of the subscriber units examined at 160 at the next group six poll. If the subscriber unit's timer has expired, the access point checks again at 178 whether the ranging/power leveling sequence is at the last of the six requests in a cycle. If so, the access point calculates at 180 an incremental increase or decrease for the output power level of the subscriber unit's transceiver 88 (FIG. 8) based on the difference between the desired power level and the value in subscriber unit's power level field, i.e., the maximum power level from the previous five responses. If the difference is greater than 4 dB, the increment (either positive or negative) is equal to 4 dB. If the difference is less than 4 dB, the increment is equal to the difference.

At 182, the access point sends a command packet to the subscriber unit with an instruction to change the subscriber unit's power output level by the increment determined at 180. The access point leaves the pointer on this subscriber unit and exits the group six poll at 184. When the access point receives a packet from the subscriber unit in response to the power leveling packet sent by the access point at 182, the access point updates the time stamp for the subscriber unit's power leveling timer and stores the received power level in the table as the last power level value. If this power level is also the greatest power level over the last six responses, it is also stored as the maximum power level.

As indicated in FIG. 11, and returning to FIG. 9, the microprocessor applies all subscriber units completing the ranging and power leveling procedures to group 4. If a subscriber unit is also a "priority" subscriber, the microprocessor also places the subscriber unit in group 7. The microprocessor assigns transmit grants based on the presence of subscriber units in groups zero through five and seven. Thus, once a subscriber unit enters these groups, it is eligible to receive a transmit grant. Downstream data from the AP to the SU does not require a transmit grant but will be filtered by the CIR/MIR manager.

The access point microprocessor sequentially polls these groups in reverse numerical order. That is, the microprocessor polls group seven and then groups five through zero. At each poll, the microprocessor first checks to see whether the group's polling timer has expired. As described above, the polling timer has a default maximum value that can decrease, depending on the number of subscriber units in the group, to a minimum value. If the timer has not expired, the microprocessor moves to the next group. If the timer has expired, the microprocessor looks to see if any subscriber units are in the group. If the group contains subscriber units, the microprocessor looks for a subscriber unit having available CIR or MIR. If none are present, the microprocessor moves to the next group. If such a subscriber units exists, the microprocessor selects its SUID as the transmit grant for the next outgoing RF data packet. The microprocessor then resets the polling routine.

By beginning the routine at group seven, the microprocessor provides a greater degree of certainty that group seven will be polled promptly upon expiration of its timer. By thereafter beginning the remainder of the poll at group five, and moving sequentially up to group zero, the microprocessor provides the opportunity to first poll those groups with longer polling timers.

The microprocessor moves subscriber units among groups zero through five depending on the frequency of their transmission of data to, and receipt of data from, the access point. As described above, every time an active subscriber unit detects its SUID in a transmit grant, it responds to the access point. If the subscriber unit has nothing to transmit, it simply echoes with a command packet enclosing its SUID and the access point's time stamp. Such echoes are not considered for polling status purposes. On the other hand, if the subscriber unit has a data packet for transmission to the access point, the subscriber unit transmits the data packet responsively to receipt of its transmit grant. The polling algorithm does consider these transmissions. Similarly, the polling algorithm does not consider command packets sent by the access point to subscriber units but does consider data packets.

The access point tracks the receipt of data packets from, and the transmission of data packets to, its subscriber units. Specifically, the access point status table includes a "last traffic time stamp"—a time stamp indicating when the last data packet was transmitted to or received from a subscriber unit. When a subsequent data packet is transmitted in either direction between the access point and the same subscriber unit, the access point overrides the earlier time stamp.

Each time the microprocessor updates the subscriber unit's last traffic time stamp, the microprocessor also moves the subscriber unit up in the polling sequence, as shown in FIG. 9. Generally, a subscriber unit moves up two groups at a time, the exception being from group one to group zero. Thus, if a data packet is transmitted between the access point and a subscriber unit in group five, the microprocessor moves the subscriber unit to group three. Subscriber units move from group three to group one and from group one to group zero. If the access point transmits or receives a data packet to or from a subscriber unit in group four, the microprocessor moves the subscriber unit to group two. Under similar circumstances, subscriber units move from group two to group zero.

If the access point does not receive a data packet from or transmit a data packet to a subscriber unit in any of groups zero, one, two, three, or four within a predetermined interval, the microprocessor moves the subscriber unit down one group. The predetermined interval varies with each group, as shown in FIG. 9. Thus, if a subscriber unit in group zero has no data packet traffic for 100 ms, the subscriber unit drops to group one. A subscriber unit in group one that has no data packet traffic within a 500 ms period drops to group two. The timers for groups two, three, and four are two seconds, two minutes, and thirty minutes, respectively.

The access point also maintains a "ping response" time stamp that is updated each time the access point receives a response packet from the subscriber unit, regardless whether the response is a command packet or a data packet. From time to time, the microprocessor determines the difference between the present time and the ping response time stamp. If the access point fails to receive any response from a transmit grant issued to a subscriber unit in a 300 second period in any of groups one through seven, the microprocessor moves the subscriber unit to group eight under an assumption that the subscriber unit has gone offline. If that is not the case, or if the subscriber unit is thereafter placed back online, the subscriber unit moves to group six and on to the data polling groups as described above. Accordingly, the polling groups shown in FIG. 9 completely describe the possible polling status of all subscriber units associated with the access point.

As described above, each subscriber unit is associated with a committed information rate (CIR) and a maximum information rate (MIR) that are established by agreement with the service provider and that are consulted before the access point conveys any Ethernet traffic to or from a subscriber unit in the form of an RF packet transmission. Similarly, the access point microprocessor also consults CIR/MIR limits at the polling operation 76 (FIG. 4) in determining whether a subscriber unit is eligible for a transmit grant. Thus, CIR/MIR limitations affect a subscriber unit's ability both to receive and transmit data and, therefore, affects the subscriber unit's position in the polling groups.

Figure 12:
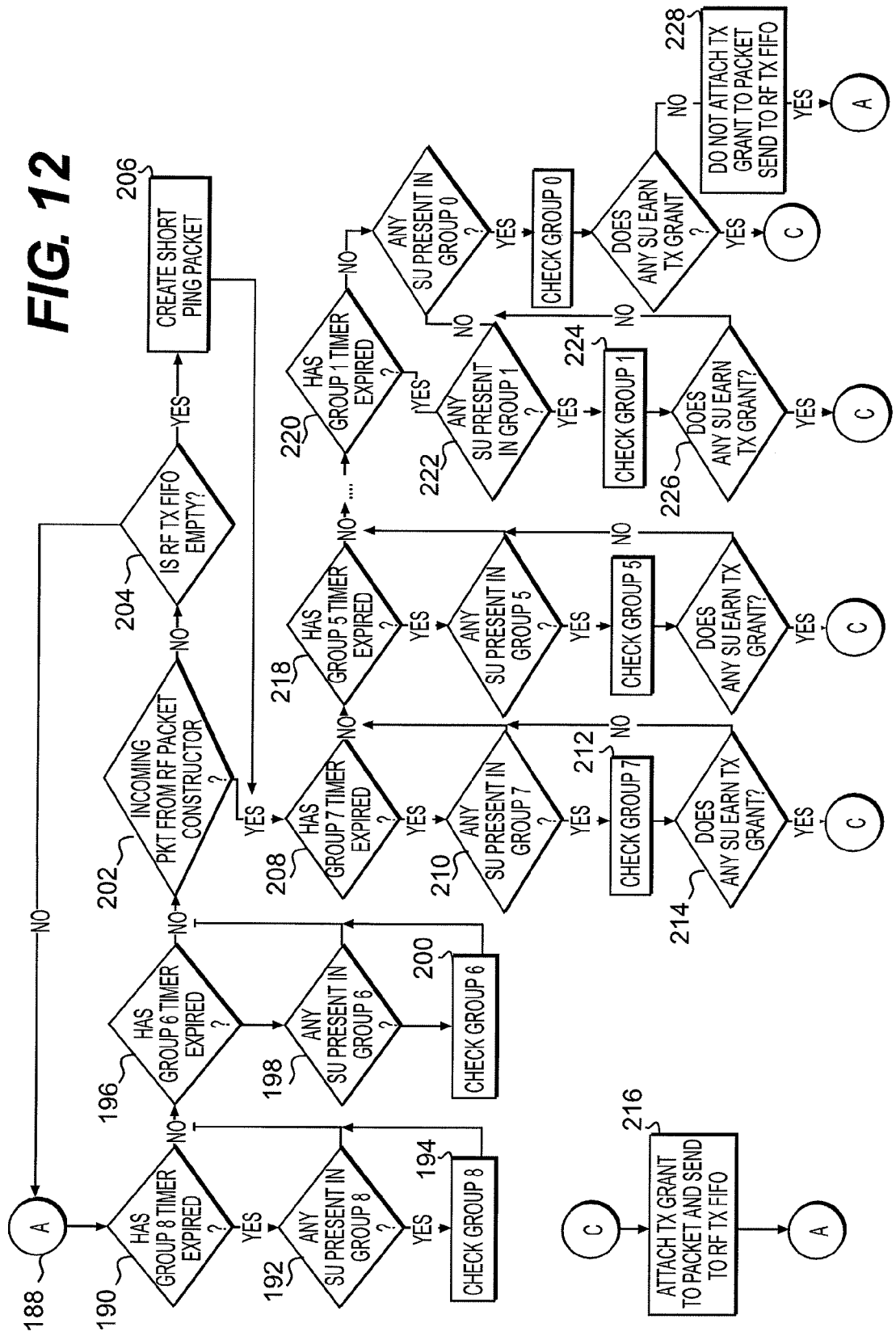
FIG. 12 is a flow diagram of part of a polling algorithm in accordance with an embodiment of the present invention.

During the polling algorithm, and referring to FIG. 12, the microprocessor only checks CIR and MIR for subscriber units in groups zero through five and group seven, since transmit grants for data packets are provided only for subscriber units in those groups. Generally, FIG. 12 reflects the sequence in which the microprocessor seeks to poll groups zero through eight. At the beginning 188 of the transmit grant polling routine at 76 (FIG. 4), the microprocessor checks at 190 to determine whether the polling timer for group eight has expired. If so, the microprocessor checks at 192 whether any subscriber units are present in the group. If so, the microprocessor executes the polling routine (FIG. 10) for group eight at 194. Upon completing the polling routine, or if no subscriber units are present in group eight at 192, or if the group eight timer has not expired at 190, the microprocessor checks the polling timer for group six at 196.

If the group six timer has expired, the microprocessor checks at 198 to determine whether any subscriber units are present in the group. If so, the microprocessor executes the polling routine (FIG. 11) for group six at 200. Upon completing the polling routine, or if no subscriber units are present in group six at 198, or if the group six timer has not expired at 196, the microprocessor checks at 202 whether a data packet is ready from RF packet constructor 75 (FIG. 4).

If the RF packet constructor is empty at 202, this means there are no data packets ready for a transmit grant. The microprocessor then checks at 204 whether any packets are ready for immediate transmission in RF transmission FIFO buffer 80 (FIG. 4). If so, the microprocessor returns to the beginning of the polling algorithm at 188.

If there are no packets in either packet constructor 75 or transmission buffer 80 (FIG. 4), the access point creates a short "ping" packet at 206 to assure that the access point transmits an outgoing packet with a transmit grant. In this way, the access point assures that it repeatedly gives subscriber units an opportunity to transmit back to the access point and update the subscriber unit's ping response time stamp. The ping packet has a time stamp and a transmit grant, as determined by the poll of groups seven through zero, but otherwise has no subscriber unit destination address or payload.

If there is an outgoing packet ready in packet constructor 75 (FIG. 4) at 202, or if the access point has created a ping packet at 206, the microprocessor checks at 208 to determine whether the polling timer for group seven has expired. If so, the microprocessor examines the group at 210 to determine whether any subscriber units are present in the group. If so, the microprocessor executes the polling routine (FIG. 13) for group seven at 212. If the group seven routine returns a subscriber unit address at 214 eligible for a transmit grant, the microprocessor assigns the subscriber unit's SUID as the packet's transmit grant at 216 and moves the packet to transmission buffer 80 (FIG. 4). The microprocessor then returns to the beginning of the polling routine at 188.

If no such subscriber unit exists in group seven at 214, or if group seven has no subscriber units at 210, or if the group seven timer has not expired at 208, the microprocessor checks the timer for group five at 218. The procedure repeats for group five and, provided no acceptable subscriber units are found, sequentially repeats for groups four, three, two, and one. If the group one timer has not expired at 220, or if no subscriber units are present in group one at 222, or if the polling routine for group one at 224 provides no eligible subscriber units at 226, the microprocessor moves directly to group zero without checking a timer. Thus, the microprocessor always checks group zero if it passes through the other groups without finding an acceptable subscriber unit. If group zero produces an acceptable subscriber unit, its SUID is attached as the outgoing packet's transmit grant at 216. If not, the microprocessor sends the packet to transmission buffer 80

(FIG. 4) without a transmit grant at 228 and returns to the beginning of the polling routine at 188.

Figure 13:
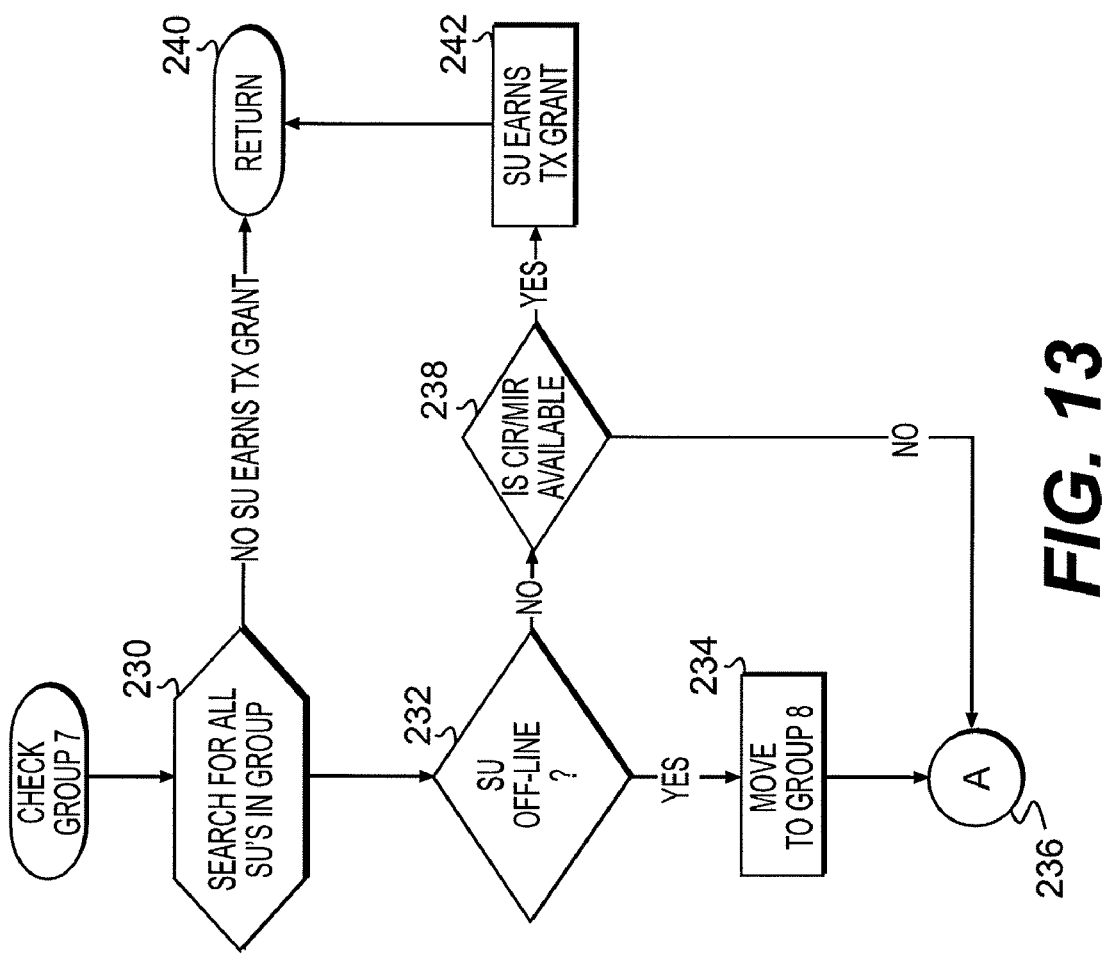
FIG. 13 is a flow diagram of part of a polling algorithm in accordance with an embodiment of the present invention.

FIG. 13 illustrates the execution of polling routine 212 for group seven. At 230, the microprocessor begins a scan of all subscriber units in group seven. Like groups zero through five, group seven includes a list of SUID'S. For each SUID, there are two pieces of data used from the dynamic database: last traffic time stamp and ping response time stamp. The subscriber units are indexed in each table in the order in which they were authenticated by the access point.

Initially, a software pointer is associated with the first subscriber unit in the group seven list. At 230, the microprocessor begins with this subscriber unit and checks its ping response time stamp at 232. If the time stamp is too old, the microprocessor moves the subscriber unit to the group eight list at 234, moves the software pointer to the next subscriber unit at 236, and returns to 230 to examine this subscriber unit.

If the subscriber unit's ping response time stamp indicates at 232 that the subscriber unit responded to its last transmit grant, the microprocessor checks the availability of CIR and MIR for the subscriber unit at 238. If CIR/MIR is unavailable, the microprocessor moves the software pointer to the next subscriber unit at 236 and returns to 230 to examine the next subscriber unit.

If the microprocessor passes through all subscriber units in the group seven list without finding an acceptable subscriber unit at 232 and 238, the software pointer is left again at the initial subscriber unit, and the microprocessor returns a negative response at 240 to step 214 in FIG. 12. If the microprocessor finds an eligible subscriber unit at steps 232 and 238, it selects its SUID at 242 and returns the SUID at 240 to step 214 in FIG. 12. The microprocessor also moves the software pointer to the next subscriber unit in the list. Thus, the microprocessor begins with this subscriber unit at the next pass through group seven.

Figure 14:
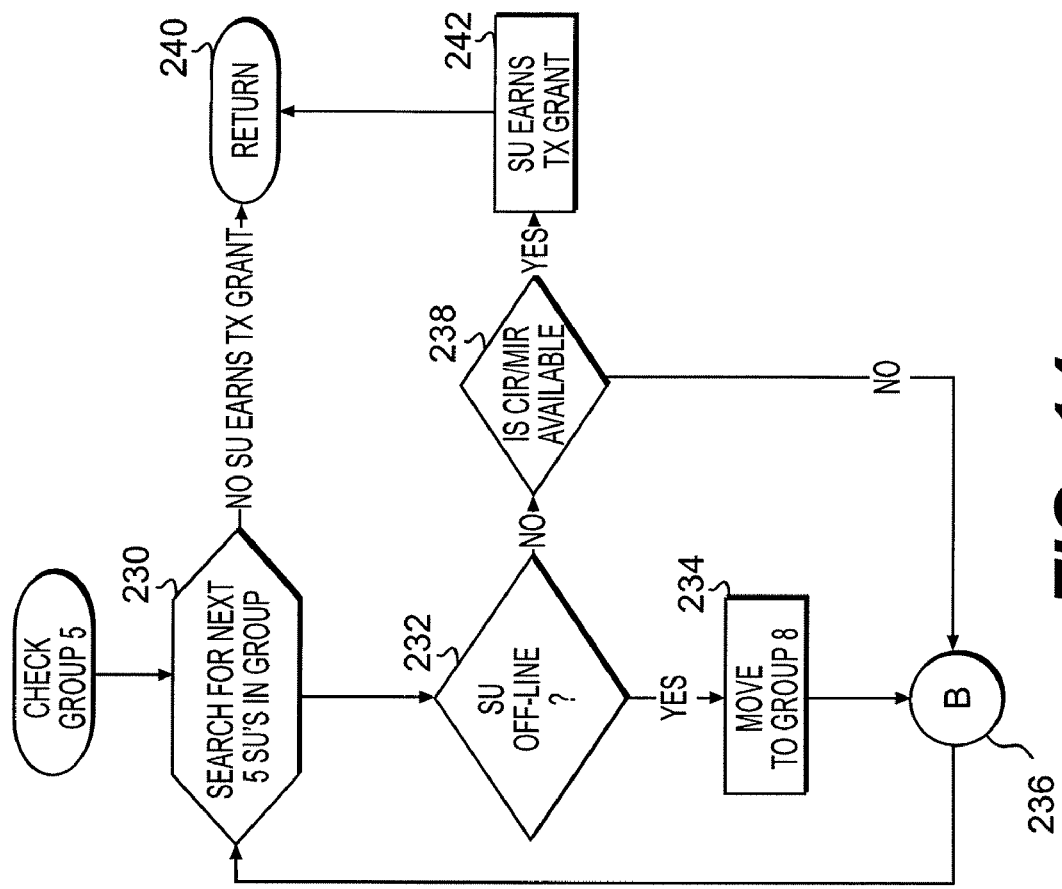
FIG. 14 is a flow diagram of part of a polling algorithm in accordance with an embodiment of the present invention.

FIG. 14 illustrates the execution of the polling routine for group five. It is the same as the group seven routine, except that the microprocessor only scans the first five subscriber units in the list, beginning with the next subscriber unit after the one at which the software pointer is located upon entry into the search. If the microprocessor fails to find an eligible subscriber unit at steps 232 and 238 among this subset of five subscriber units, it exits the routine at 240. If the microprocessor finds an eligible subscriber unit, it returns that subscriber's SUID at 242, then exits at 240.

Figure 15:
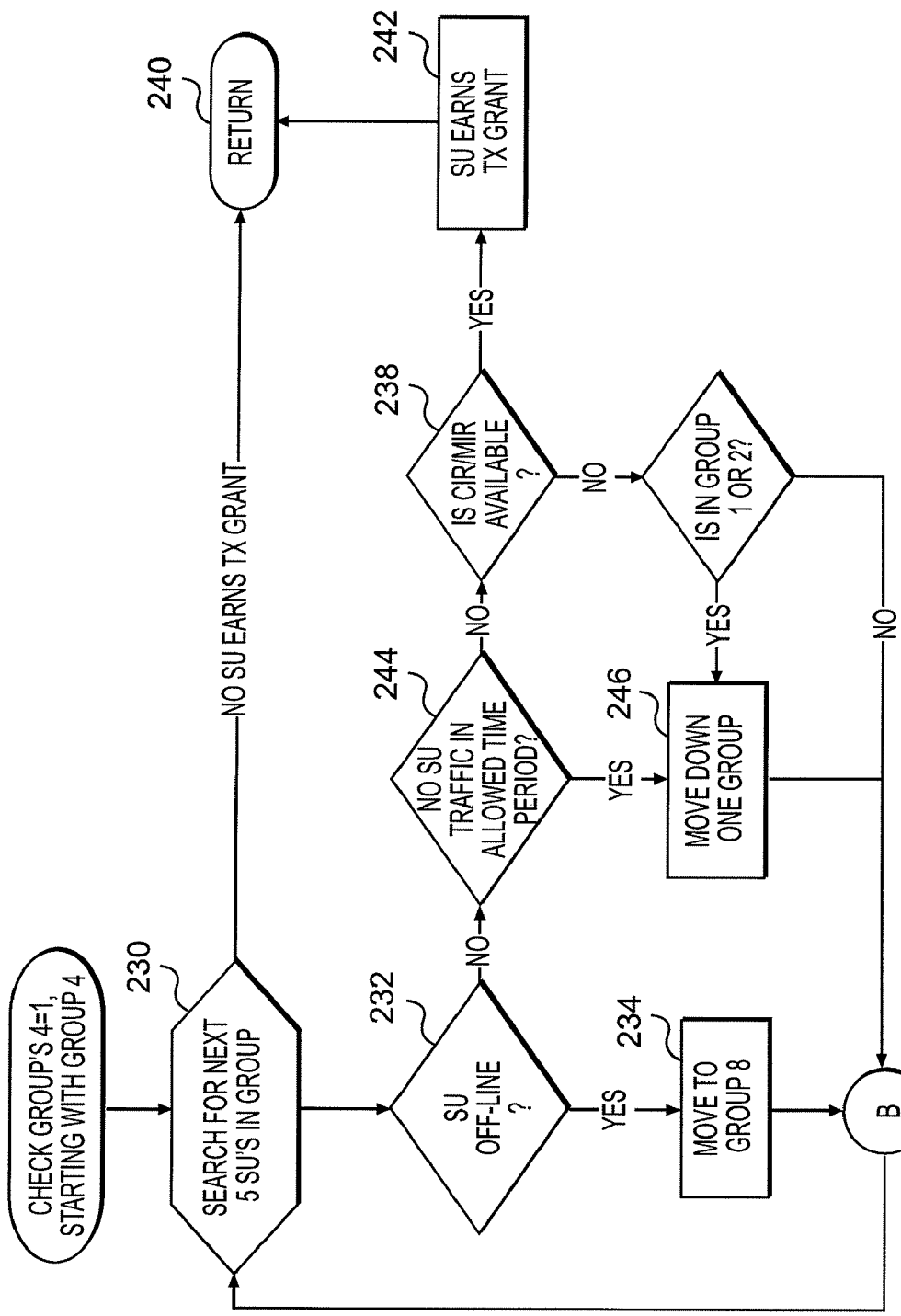
FIG. 15 is a flow diagram of part of a polling algorithm in accordance with an embodiment of the present invention.

FIG. 15 illustrates the execution of the polling algorithm for each of groups one through four. It is the same as the group five routine, except that between the offline check and the CIR/MIR check, the microprocessor checks the subscriber unit's last traffic time stamp at 244. Because the microprocessor replaces a subscriber unit's last traffic time stamp every time the access point receives or transmits a data packet from or to the subscriber unit, the difference between the present time and the last traffic time stamp is a measure of how recently the subscriber unit has required data bandwidth. If the subscriber unit has not used data bandwidth within the time limit (see FIG. 9) for the particular group, the microprocessor moves the subscriber unit down one group at 246.

Additionally, if CIR and MIR are unavailable for a subscriber unit at 238, and if the subscriber unit is in groups one or two, the microprocessor moves the subscriber unit down one group at 246.

Figure 16:
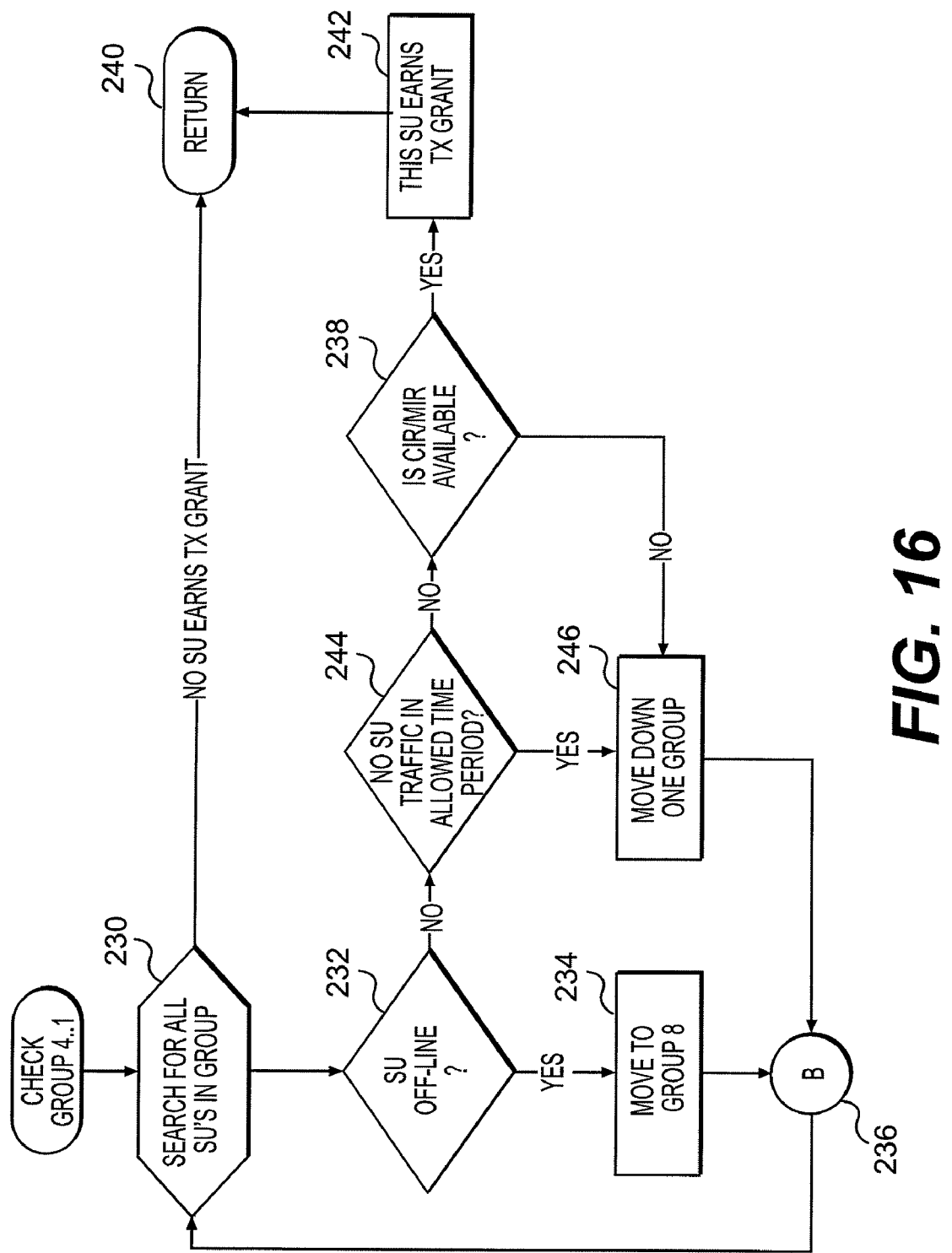
FIG. 16 is a flow diagram of part of a polling algorithm in accordance with an embodiment of the present invention.

FIG. 16 illustrates the execution of the polling algorithm for group zero. It is the same as the routine for groups one through four, primarily except that the microprocessor reviews all subscriber units, not just the first five, until finding an eligible subscriber unit. Additionally, if CIR and MIR are unavailable for a subscriber unit at 238, the subscriber unit is moved down to group two at 246.

C. CIR/MIR Management

Figure 17:
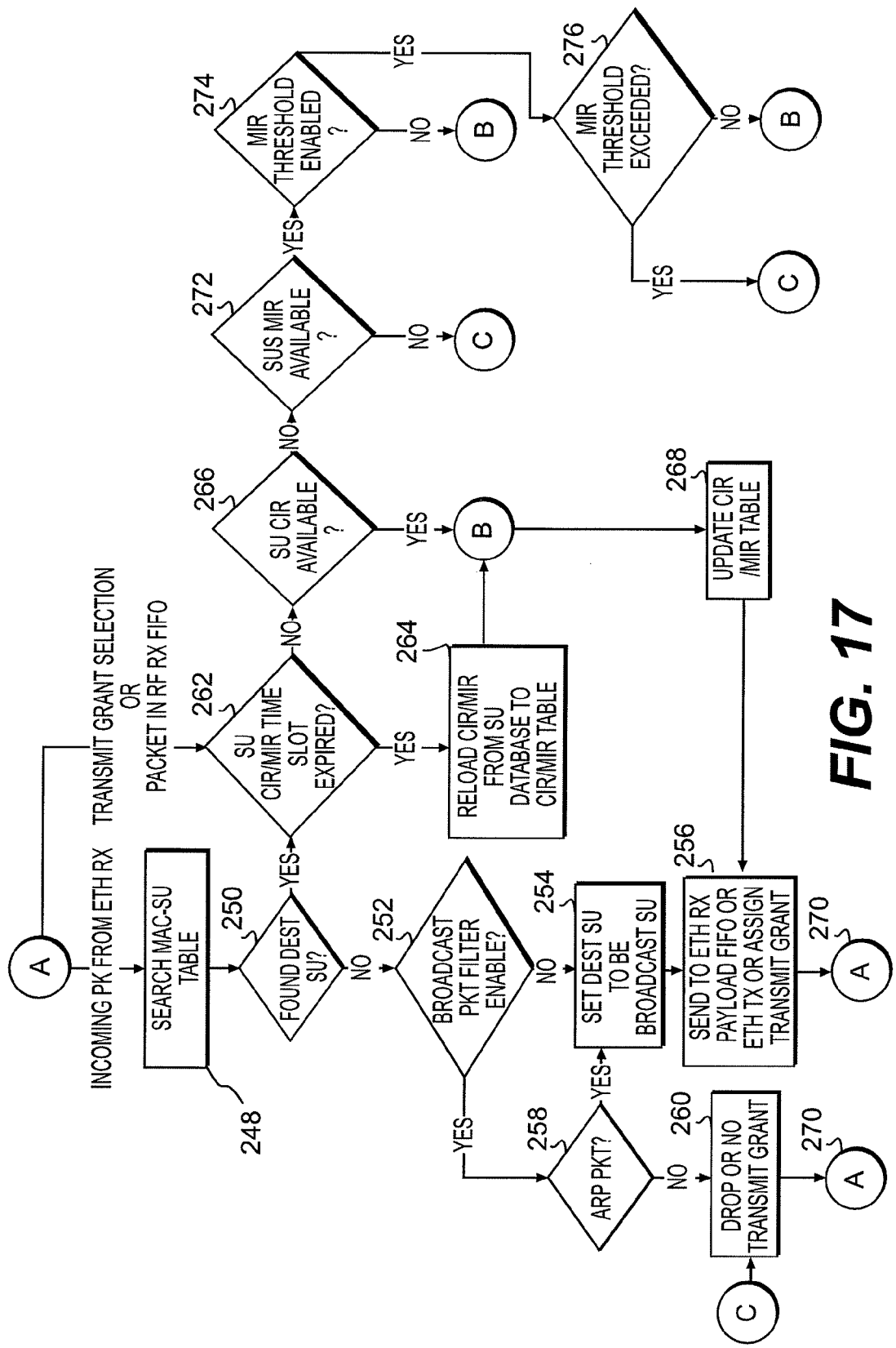
FIG. 17 is a flow diagram illustrating an information rate management procedure in accordance with an embodiment of the present invention.

FIG. 17 illustrates the procedure executed by the microprocessor in checking for CIR/MIR availability, which the microprocessor determines from information maintained by the microprocessor at the access point database. Each subscriber unit status table entry has "CIR remaining" and "MIR remaining" entries. The last traffic time stamp is also used and is referred to in this discussion as the "IR time stamp." At system startup, the microprocessor initializes the IR time stamps of all subscriber units. That is, all subscriber units have approximately the same time stamp. The CIR remaining entry begins as the subscriber unit's rated CIR value, while the MIR remaining value starts as the difference between the rated MIR value and the rated CIR value. For example, assume that a subscriber unit's rated CIR value is 1.5 Mbits/sec and that its MIR is 10 Mbits/sec. When the microprocessor updates the CIR/MIR remaining values in the subscriber unit's slot in the status table, the CIR is 1.5 Mbits/sec, and the remaining MIR is 8.5 Mbits/sec.

The microprocessor decrements the status table entry's CIR value each time the access point transmits a data packet to, or receives a data packet from, the particular subscriber unit. Command packets do not count against CIR usage. If CIR has been completely used (i.e., the CIR value in the status table is zero), the microprocessor decrements MIR. If MIR is also depleted, the microprocessor leaves both values as zero and drops the packet.

When the microprocessor receives an Ethernet packet from Ethernet switch 46 (FIG. 3) and finds a destination subscriber unit in the MAC address table, the microprocessor decrements CIR (or MIR, if CIR has expired) for that subscriber unit in the status table by the number of bits in the Ethernet packet's payload. Similarly, when the access point receives an RF packet for a subscriber unit and parses out an enclosed Ethernet packet to the Ethernet switch, the access point microprocessor decrements the subscriber unit's remaining CIR or MIR.

Referring again to FIG. 4, the access point checks CIR/MIR availability twice: (1) when receiving an Ethernet packet destined for a user device at 47, and (2) when selecting a subscriber unit for a transmit grant at 76. In the first instance, the access point checks CIR and MIR to see if a subscriber unit is eligible to receive a given packet currently in the system. In the second instance, the access point prospectively checks CIR/MIR so that the subscriber unit selected for a transmit grant can transmit a packet within its CIR/MIR limits.

Referring to FIG. 17, when the access point receives a packet from Ethernet port 46 (FIG. 3) the access point microprocessor searches the MAC-SU List at 248 for the subscriber unit address associated with the packet's destination MAC address, as described above. If the SUID is not found at 250, the microprocessor checks an Ethernet broadcast filter at 252.

As should be understood in this art, an access point may receive various packet types. Certain higher-level protocols make use of broadcast-type packets. These packets are not addressed to a signal destination device, but instead request that they be sent to all (broadcast) or some (multicast) destinations in the access point's sector. It is possible that an excessive number of such packets, particularly if received during periods of high traffic, could slow system performance. Accordingly, the access point maintains an Ethernet broadcast "filter" as a decision block at 250 in the routine shown in FIG. 17 that determines whether to forward broadcast packets. Thus, the operator may allow or prohibit Ethernet broadcast and multicast packets, depending on system needs. In the presently described embodiment, the Ethernet broadcast filter does not affect broadcast of ARP broadcast packets.

If the broadcast filter is disabled at 250, the access point sets the destination address for the resulting RF packet at 254 to broadcast the packet to all subscriber units and sends the packet to Ethernet payload FIFO 73 (FIG. 4) at 256. If the filter is enabled, the microprocessor determines whether the broadcast packet is an address resolution protocol (ARP) packet at 258. If not, the access point drops the packet at 260.

As should be well understood, an ARP packet is a type of Ethernet packet. An Ethernet packet typically has source and destination MAC addresses. When a user device, such as a personal computer, initiates a communication with a system for which the PC has an IP address, but not a MAC address, the PC may transmit an ARP packet requesting a destination address. The destination device receives the ARP packet and responds with an ARP packet having the destination MAC address or a secure version of it.

When a user device is initially installed, it does not know the MAC addresses of destination devices with which it may need to communicate. Thus, its initial transmission through the access point will be an ARP packet, and the initial packet coming back through the Ethernet port for the user device will be a responsive ARP packet. The responsive ARP packet has the user device's IP address, but not its MAC address, and the access point therefore needs to broadcast the ARP packet to all subscriber units. As described above, the user device's subscriber unit responds to the broadcast, and the access point adds this relationship to the MAC-SU List.

Downstream broadcast packets do not count against subscriber unit CIR/MIR. All forms of broadcast packets count against CIR/MIR, however, if they come upstream from a subscriber unit.

When a subscriber unit is selected for a transmit grant, or when the access point receives a data packet from a subscriber unit, or when the access point finds the subscriber unit SUID for an incoming Ethernet packet at 250, the microprocessor checks the subscriber unit's IR time stamp at 262. As described above, a subscriber unit's information rate is measured over a one-second look back. If the subscriber unit's IR time stamp is over one second old, the look-back period has expired, and the microprocessor updates the IR time stamp, the CIR value and the MIR value in the status table at 264. That is, the microprocessor replaces the old IR time stamp with a current time stamp and resets the remaining CIR and MIR for the subscriber unit with the subscriber unit's rated CIR and rated CIR/MIR differential.

If the time stamp has not expired at 262, the microprocessor checks the CIR status for that subscriber unit at 266. If the CIR is greater than zero, the microprocessor decrements the remaining CIR value in the status table by the number of bits in the data packet's payload or, if the number of bits is greater than the remaining CIR, sets the CIR to zero and, at 256, (1) sends the Ethernet packet to buffer 73 (FIG. 4), or (2) sends the required RF packet to receive buffer 98 (FIG. 4), or (3) assigns the subscriber unit's MAC address as the transmit grant in the next outgoing packet, as appropriate. If the CIR check is for selection of a transmit grant, step 268 is omitted. The microprocessor exits the routine at 270.

If the CIR check is for an upstream data packet received from a subscriber unit, and if the CIR is zero at 266, the microprocessor exits the routine and processes the packet. If the CIR check is for a transmit grant or a downstream packet, and if CIR is zero at 266, the microprocessor checks the status table at 272 to see if the subscriber unit's MIR is greater than zero. If not, the microprocessor drops the downstream packet at 260, or indicates in a transmit polling routine that no CIR/MIR is available, as appropriate. If MIR is available, the microprocessor checks at 274 to determine whether the MIR threshold is enabled.

The MIR threshold is programmable by the system operator, who may communicate with and control the access point through any suitable means, for example a hyper-terminal connection or a telnet session. The MIR threshold is a measure of system usage above which MIR will not be available to the subscriber units.

If the MIR threshold is enabled, the microprocessor monitors the overall system information rate on a one-second look back each time a packet comes in from the RF receiver or a packet comes into the Ethernet port. For example, assume that the overall system capacity is 10 Mbits/sec and that the default MIR threshold is 6 Mbits/sec. Unless the operator disables the MIR threshold, the microprocessor monitors the overall data traffic through the access point on a second-by-second basis. If the total information rate rises above the threshold, the access point no longer permits outgoing traffic for any subscriber unit, or the assignment of a transmit grant to any subscriber unit, based on MIR capacity. Thus, as system capacity grows, the MIR threshold inhibits excessive MIR use to the detriment of CIR use.

If the MIR threshold is enabled at 274, the microprocessor checks the threshold at 276 to determine whether system traffic has exceeded the threshold. If not, then the subscriber unit's MIR is available, and the microprocessor takes the appropriate action at 268 and/or 256. If system usage exceeds the MIR threshold at 276, the microprocessor drops the packet at 260, or indicates in a transmit polling routine that no CIR/MIR is available, as appropriate.

D. Packet Arrangement

FIGS. 18A and 18B illustrate an exemplary structure for packets passing downstream from the access point to a subscriber unit. As indicated above, packets may be described generally as either command packets or data packets. Data packet 66 is described generally above. It includes an RF preamble and header 72, a scrambled MAC data packet header 70, and a scrambled payload 68. The MAC data packet header has several fields. A source access point ID 270 is the MAC address for the access point. A MAC data packet length 272 is the length of the MAC data packet, including the data packet header and the payload. A transmit grant subscriber unit ID 274 is the MAC address of the subscriber unit chosen for the next transmission slot through the polling algorithm.

A packet header checksum field 276 includes checksum bits for use by the downstream subscriber unit. The subscriber unit, upon receiving the RF data packet, counts the number of bits in the MAC data header and the payload. The last four bytes of this sum should match the number in checksum field 276. If it does, the subscriber unit accepts the packet. If not, it is assumed that there has been a transmission or reception error, and the subscriber unit drops the packet. The use of checksums should be well understood in this art.

As described above, each received Ethernet packet includes a destination MAC address and a payload. The access point microprocessor locates the subscriber unit SUID from the MAC-SU List corresponding to the Ethernet packet's destination address and places it into field 280. The access point microprocessor also supplies transmission grant subscriber SUID 274, packet header checksum 276, access point ID 270, and data packet length 272. The Ethernet packet itself goes to payload 68.

Because payload 68 is relatively large (in this example, 1,600 bytes), it may be possible to fit multiple Ethernet packets into a single RF data packet payload within the 1600 byte capacity. Thus, the microprocessor reads the length of each incoming Ethernet data packet and combines these packets, up to a maximum of four Ethernet data packets, into a single RF data packet payload. Accordingly, MAC data packet header 70 includes four pairs of payload header fields 280A/282A-280D/282D, each including the subscriber unit destination ID 280 and the length 282 of a corresponding section 284 of payload 68 that contains the applicable Ethernet data packet.

For example, suppose the access point transmits a data packet having four payloads destined for four different subscriber units. Since all subscriber units in the access point's sector receive all transmissions from the access point, each of the four subscriber units read its SUID in the MAC data packet header. By reading the payload lengths 282A-282D, the subscriber unit microprocessor knows the position of its payload within payload section 284A-284D. Thus, the subscriber unit is able to parse out its Ethernet data packet from the overall RF data packet payload 68.

Command packets are in the form as indicated at 286. The command packet includes an RF preamble and header 288 that is identical to the RF preamble and header 72 of the RF data packet. Like the RF data packet, the command packet portion is scrambled and is comprised of a command packet header 288 and a command payload 290. Command packets are generated by the access point and are used for various functions, for example to provide firmware updates and to issue ranging and power leveling commands.

As with the MAC data packet header, the command packet header is constructed by the access point microprocessor. It includes a source access point identification field 292, a command packet length field 294, a destination subscriber unit identification field 296, a command field 298, a transmission grant subscriber unit SUID 300, and a packet header checksum field 302. Source access point identification field 292, transmit grant subscriber unit identification field 300, and checksum field 302 are similar to the corresponding fields in the data packet. Unlike the data packet, however, the transmit grant might not be determined from the polling algorithm. In authentication and ranging packets, for example, the transmit grant ID is the same as the subscriber unit destination 10. For firmware upgrades, however, the polling algorithms are used to determine transmit grant. Generally, the transmit grant field of a command packet will depend on the purpose of the command.

The command packet length field 294 is the total number of bytes in the command packet header and the command payload. The destination subscriber unit ID field 296 is the MAC address of the destination subscriber unit or, for packets intended for all subscriber units, a special SUID for broadcast.

Command field 298 indicates the command type and provides any applicable parameters that the subscriber unit may need to effect and/or respond to the command. If there is insufficient room in the command field, this information may also be included as part of the payload, which carries any data accompanying the command.

Command packets may be used, for example, to download firmware to the subscriber units. From time to time, the access point broadcasts program updates to the subscriber units through a series of command packets. The command field in each packet identifies (1) the packet as being part of a firmware update, (2) the update version number, (3) the subscriber unit hardware to which the firmware is applicable, and (4) a unique identifier indicating the position of the payload's programming segment in the overall program. If the currently running firmware version number matches the packet's version number, or if it doesn't have the same applicable hardware identified in the command, the subscriber unit ignores the packet. If the subscriber unit satisfies these conditions, however, the subscriber unit accepts the packet and stores the program code section carried by the command packet payload in a local buffer.

The access point inserts a checksum number in the last packet sent during the update. When the subscriber unit receives this packet and detects the checksum in the command field, the subscriber unit compares the checksum number to a checksum that it calculates using the bytes received in the update. If calculated and received checksums for the new firmware match, the subscriber unit has correctly received the entire firmware download, and it updates its flash memory to the newly received version.

If the checksum does not match, the subscriber unit will continue to receive the new packets from the AP and overwrite the same buffer locations used previously. After the last packet is again received, the subscriber unit again calculates the checksum and compares to the received checksum. Eventually, the checksums match, and the subscriber unit updates its firmware.

Figures 19A, 19B:
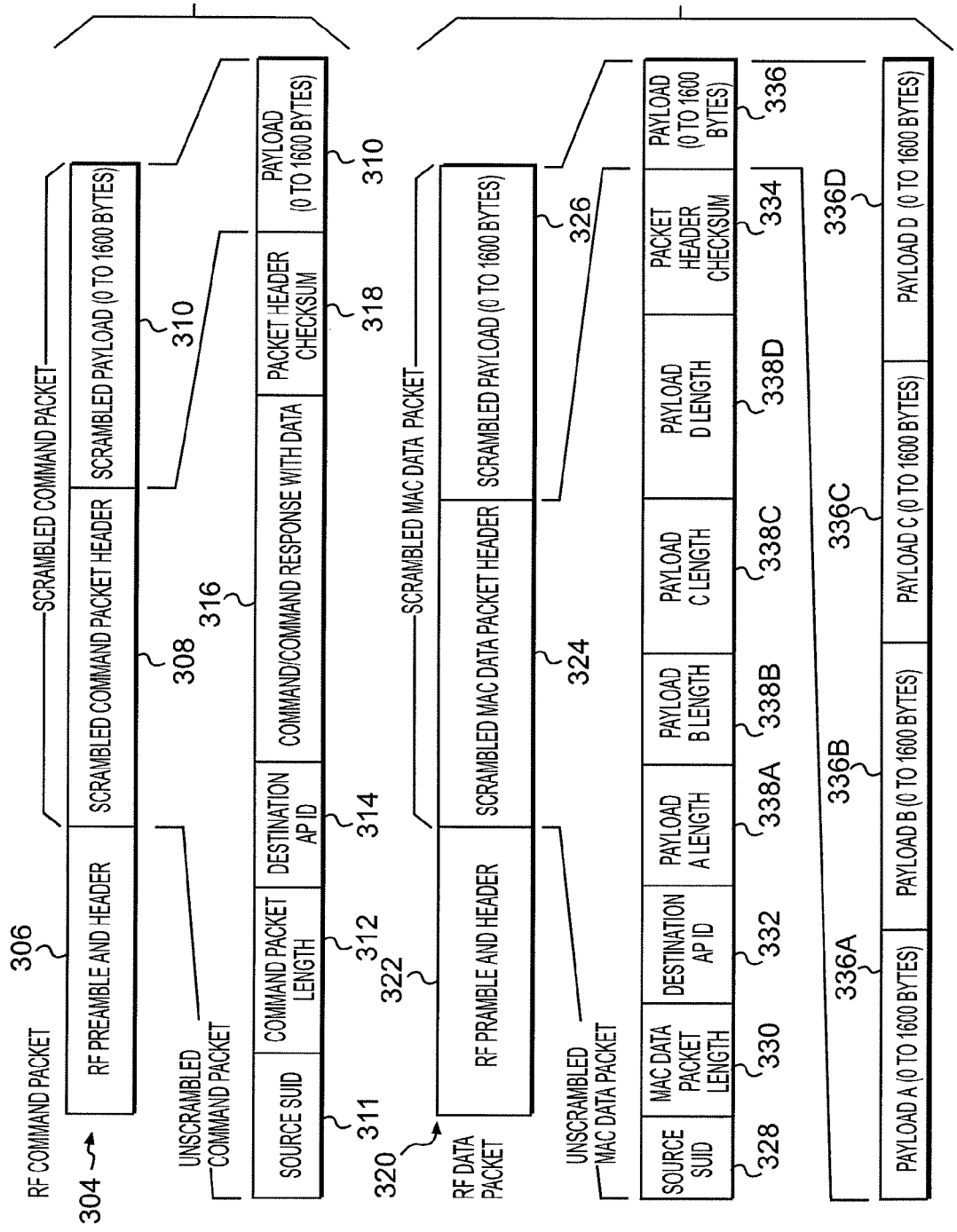
FIGS. 19A and 19B are a diagrammatic illustration of command and data packets transmitted from subscriber units in accordance with an embodiment of the present invention.

Referring now to FIGS. 19A and 19B, command packets, indicated at 304, sent from a subscriber unit to the access point are similar to downstream command packets from the access point. Like the access point command packets, subscriber unit command packets include an RF preamble and header 306, a scrambled command packet header 308 and a scrambled payload 310. Like the access point RF preamble and header, the subscriber unit header 306 is added to the RF packet by the baseband processor.

Command packet header 308 includes a source subscriber unit identification field 310, a command packet length field 312, a destination access point identification field 314, a command field 316 and a checksum field 318. Source ID field 310 contains the originating subscriber unit's SUID. Command packet length field 312 includes the number of bytes in header 308 and payload 310. Command field 316 indicates the type of command and may include responsive data.

Subscriber units primarily transmit command packets responsively to command packets received from the access point. In response to a ranging request, for example, the subscriber unit returns a command packet in which the command field identifies the packet as a ranging request response and that includes the time stamp that was included in the request packet. Under certain off-normal circumstances such as an alarm condition that might indicate a failure, the subscriber unit may originate a command packet that is not responsive to an access point command. For example, the subscriber unit may perform self-diagnostics and generate command packets to report the results of such analysis. In this event, the subscriber unit creates the command packet and stores the packet in memory until receiving a transmit grant from the access point.

Command packet payload 310 may include data related to the command. The payload may include for example, diagnostic information or an echo of test bits sent by an access point command packet.

An upstream RF data packet 320 is similar to downstream RF data packet 66 (FIG. 18). It includes an RF preamble and header 322, a scrambled MAC data packet header 324 and a scrambled MAC payload 326. The MAC data packet header includes a source subscriber unit ID 328, a MAC data packet length field 330, a destination access point ID 332 and a header checksum 334. Source subscriber unit ID field 328 includes the subscriber unit's SUID. MAC data packet length field 330 includes the number of bytes in the MAC data packet header and the payload. Destination access point ID field 332 includes the access point's SUID.

Like the downstream data packet, the upstream data packet may include up to four packets for different destinations. Each payload section 336A-336D, if all four are used, holds a separate Ethernet data packet. Corresponding length fields 338A-338D define the number of bytes for each respective payload segment. Thus, upon receiving the RF data packet, the access point reads the payload lengths, parses the payload accordingly, and outputs the parsed Ethernet data packets through its Ethernet port.

E. Antenna

Returning to FIGS. 3, 5 and 8, each access point and each subscriber unit includes a pair of antennas that are horizontally and vertically polarized, respectively. It should be understood that any suitable antenna arrangement may be used. For example, a stacked electromagnetically-coupled patch array antenna may include a pair of printed circuit board substrates stacked one above the other. Each board has a metal foil layer into which a plurality of patch elements are etched. The boards are not electrically connected and are separated by foam or air. Stacked patch arrays should be understood in this art and are described in Kai Fong Lee and Wei Chen, *Advances in Microstrip and Printed Antennas* 53-63 (1997). Stacked patch arrays may be used to define a relatively large achievable bandwidth, for example 12%, but are relatively expensive to produce.

Figure 20:
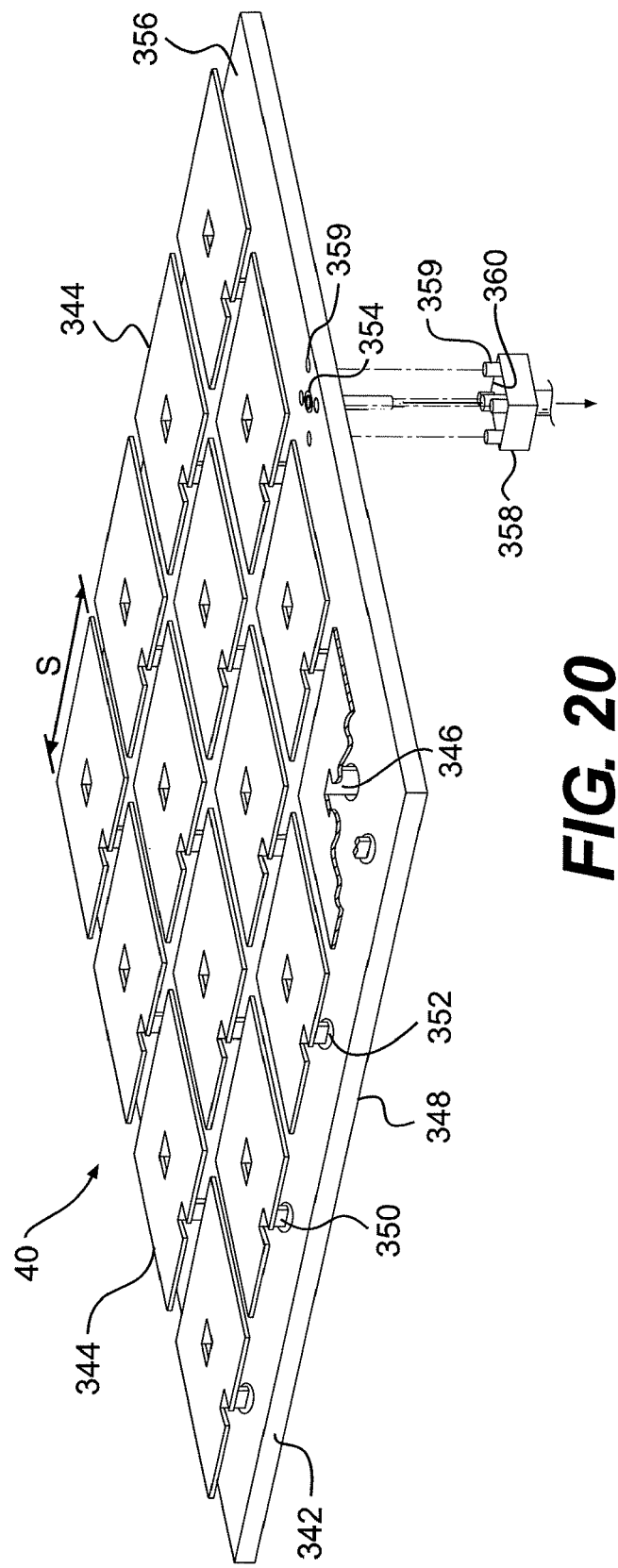
FIG. 20 is a perspective view an antenna array in accordance with an embodiment of the present invention.

Referring to FIG. 20, a patch array antenna 40 according to an embodiment of the present invention has a printed circuit board base 342 upon which are disposed four rows of four patch elements 344 separated from each other in each of the vertical and horizontal directions by a distance S. In the embodiment illustrated in FIG. 20, each patch is made from a stamped metal such as copper, brass or other high-conductivity metal. The patch is a 0.898" by 0.898" square and is 0.015" thick. Each patch sits 0.1" above base 522, and distance S is 1.2".

Base 342 is made of a R4003 substrate with two foil copper layers on either side. In the present embodiment, the base is 0.035" thick, but it maybe made to any suitable thickness. The substrate is 0.032" thick, and each foil layer is 0.0015" thick. The foil layers are etched to provide points of attachment for the patch elements on one side and to provide a feed network on the other.

Each patch element has two connections to base 342. A center post 346 is stamped from the center of each patch element 344 and is soldered directly to upper copper foil surface 356. As is described in more detail below, copper foil surface 356 is a ground plane. Since each patch element resonates primarily at its edges, however, there is minimal electrical current flowing at the direct connection between the center posts and the ground plane.

A feed post 350 is stamped from the edge of each patch element. In contrast to the center post, feed post 350 extends from a lower impedance high-resonance area of the patch element, which conducts electric signals that correspond to the electromagnetic signals detected by the patch element. To avoid grounding this signal, a relief area 352 is etched into ground plane foil layer 356 to receive each feed post 350. A relief area 354 is also defined in the ground plane for receipt of a coaxial connector, as described below.

Feed post 350 may be connected by a via, a conductive pin or other means to a network of feed lines defined on an opposite side 348 of base 342. The feed lines are formed from a copper foil layer etched into a corporate feed network arrangement.

Procedures for etching patterns into a foil layer on a printed circuit board should be well understood in this art. Generally, however, an etch resistant material is disposed on each side of base 342 over the areas at which it is desired for the copper foil to remain. Thus, the etch resistant material covers the entire side 356, except for relief areas 352 and 354. On side 348, the etch resistant material is disposed over the desired feed network. An etching agent is then applied to the foil surfaces that removes all unmasked copper foil areas.

Before or after etching, holes are drilled through base 342 at each relief area 352 and 354, and 359. The edges of base 342 and surfaces 348 and 356, except for the drilled holes, are covered, and the base is placed in a suitable bath to prepare the cylindrical surfaces of the drilled holes to receive a copper solution. Upon application of the copper, the vias provide an electrical connection for the coaxial connector and conductive paths from feed posts 350 to the feed network defined on side 348 that are isolated from the ground plane on side 348. Solder paste is then applied to vias inside the relief areas 352, and patch elements 344 are placed on base 342 so that posts 350 are received by the vias inside the relief areas. Heat is applied so that a reflow seats posts 350 in the relief areas in electrical connection to the vias. Holes may also be drilled through the ground plane and the circuit board to receive center posts 346 so that they may be set into position for soldering to the ground plane.

It should be understood that various methods may be employed for attaching the patch elements to the base and for electrically connecting the elements to the feed network. For example, a pin may be inserted through base 342 to electrically connect a post 350 to the feed network. Thus, it should be understood that the structure described herein is provided for purposes of example only.

Figure 21:
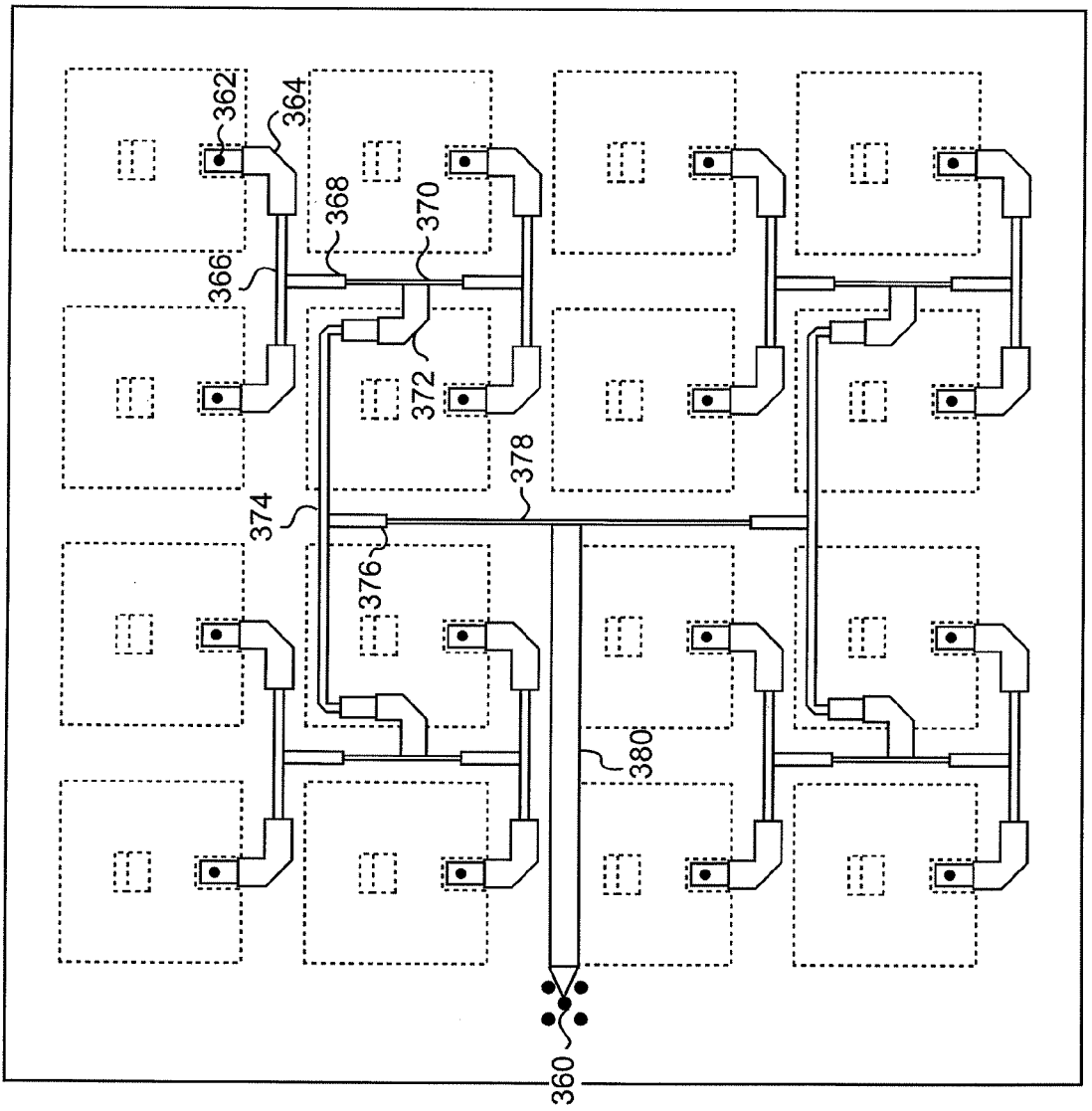
FIG. 21 is a rear plan view of the antenna array illustrated in FIG. 21.

A coaxial connector 358 has a center conductor 360 that extends into the via at relief area 354 so that the center conductor is connected to the feed network at 360 (FIG. 21). Four pins 359 extend through base 342 and the ground plane and attach to the coaxial connector's outer conductor, thereby securing the coaxial connector in position and grounding the outer conductor.

Referring also to FIG. 21, the feed network is a "corporate" network that combines the power received from each patch element and delivers the combined signal to center conductor 360 of coaxial connector 358. In the presently described embodiment, connector 358 is a 50 ohm connector, and each feed point 362 sees a 50 ohm impedance from its patch element and via. At 5.77 GHz, a microstrip section 364 is a one-quarter wave 70 ohm transformer between the 50 ohm impedance at 362 and a 100 ohm microstrip 366. Microstrip 366 combines in parallel with the 100 ohm microstrip from the neighboring patch element into a transformer 368. One-quarter wave 70.7 ohm transformer 368 transforms the resulting 50 ohm connection to a 100 ohm microstrip 370. Microstrip 370 also combines in parallel to a neighboring 100 ohm microstrip into a 70 ohm transformer 372 to a 100 ohm microstrip 374. Microstrip 374, in turn, combines in parallel with a neighboring microstrip to a 70 ohm transformer 376 into a 100 ohm microstrip 378. 100 ohm microstrip 378 combines in parallel with a neighboring 100 ohm microstrip at a 50 ohm microstrip trace 380 that conveys the summed power to coaxial connector 358 at 360.

Accordingly, the coaxial connector and the corporate feed network define a stable 50 ohm impedance network up to the patch elements. To operate at greatest efficiency, therefore, the patch elements should also present an approximately 50 ohm impedance. As should be well understood, the patch elements themselves operate over a "radiation bandwidth" at which the array has a gain within a desired range, for example 17 dB+/−1 dB. In the present embodiment described herein, the radiation bandwidth is between 5.725 GHz and 5.850 GHz. The patch elements' impedance, however, varies with frequency, and the elements only define an impedance giving an acceptable impedance match, or reflection coefficient, over a relatively small percentage of the radiation bandwidth. This percentage defines the antenna array's achievable bandwidth. Thus, for example, an antenna array with a radiation bandwidth centered at 5.77 GHz and having a 1% achievable bandwidth has an operative frequency range of 5.77 GHz+/−0.029 GHz, i.e. 0.058 GHz over the center frequency.

Of course, the range of what is considered an acceptable reflection coefficient may depend on the performance required of an antenna in a given system. Reflection coefficient is a measure of how much energy is reflected back from the load compared to how much is transferred to the load. A voltage standing wave ratio (VSWR) within a range of 1.5 to 1.0 may be considered good, although a VSWR of 2.0 to 1.0 may be acceptable. A 1.5 VSWR corresponds to a 0.20 reflection coefficient. A 2.0 VSWR corresponds to a 0.343 reflection coefficient and a 0.5 dB mismatch loss, meaning that 0.5 dB of the achievable gain will be lost.

As should be well understood in this art, several things affect a patch array's achievable bandwidth. Chief among these are dielectric thickness and dielectric losses between the patch element and ground. In the arrangement illustrated in FIGS. 20 and 21, air is the dielectric between patch elements 344 and ground plane 356, thereby providing improved gain and less loss over a non-air dielectric. Furthermore, because top surface 356 of base 342 defines the ground plane, the entirety of rear side 348 is available to define the feed network. Accordingly, the antenna arrangement allows a large degree of freedom in defining the network's physical structure to achieve a desired impedance match.

The embodiment described herein defines an achievable bandwidth of approximately 2.5% for a VSWR of 1.5:1. It should be understood, however, that the various antenna parameters, for example the height of the elements above the ground plane and the spacing S between the elements, can be varied as desired to trade off gain, bandwidth and radiation sidelobe levels against each other. Additionally, because air may not couple the patch elements to the ground plane as well as a non-air dielectric, the ability to minimize patch element spacing S may be limited, depending on the construction of the patch elements, by the elements' tendency to couple with each other.

Furthermore, it should be understood that the antenna may otherwise vary. For example, the patch elements may define shapes other than squares and may not necessarily be coplanar with each other. In addition, feed posts from multiple patch elements may connect to the same feed point in a network that defines a suitable impedance match. In addition, the patch elements may be stamped and mounted to the printed circuit board using surface mount techniques to reduce manufacturing time.

As described above, each subscriber unit includes two patch arrays such as shown in FIGS. 20 and 21. The array shown in FIG. 20 is vertically polarized. The second patch array at the subscriber unit is identical to the array shown in FIG. 20, except that it is rotated 90 degrees to establish a horizontal polarization. In a preferred embodiment, the antenna arrays are disposed on the same printed circuit board, stacked one above the other. To improve the antenna's front to back ratio, which may be reduced due to feed line coupling, the edges of the feed side 348 are grounded to the edge of a metallic enclosure that houses the antenna and the subscriber unit or access point.

The coaxial connector from each antenna array is connected to the subscriber unit circuitry. The subscriber unit microprocessor controls an electronic switch that selects the connection of one of the two connectors to the subscriber unit's transceiver.

Figure 22:
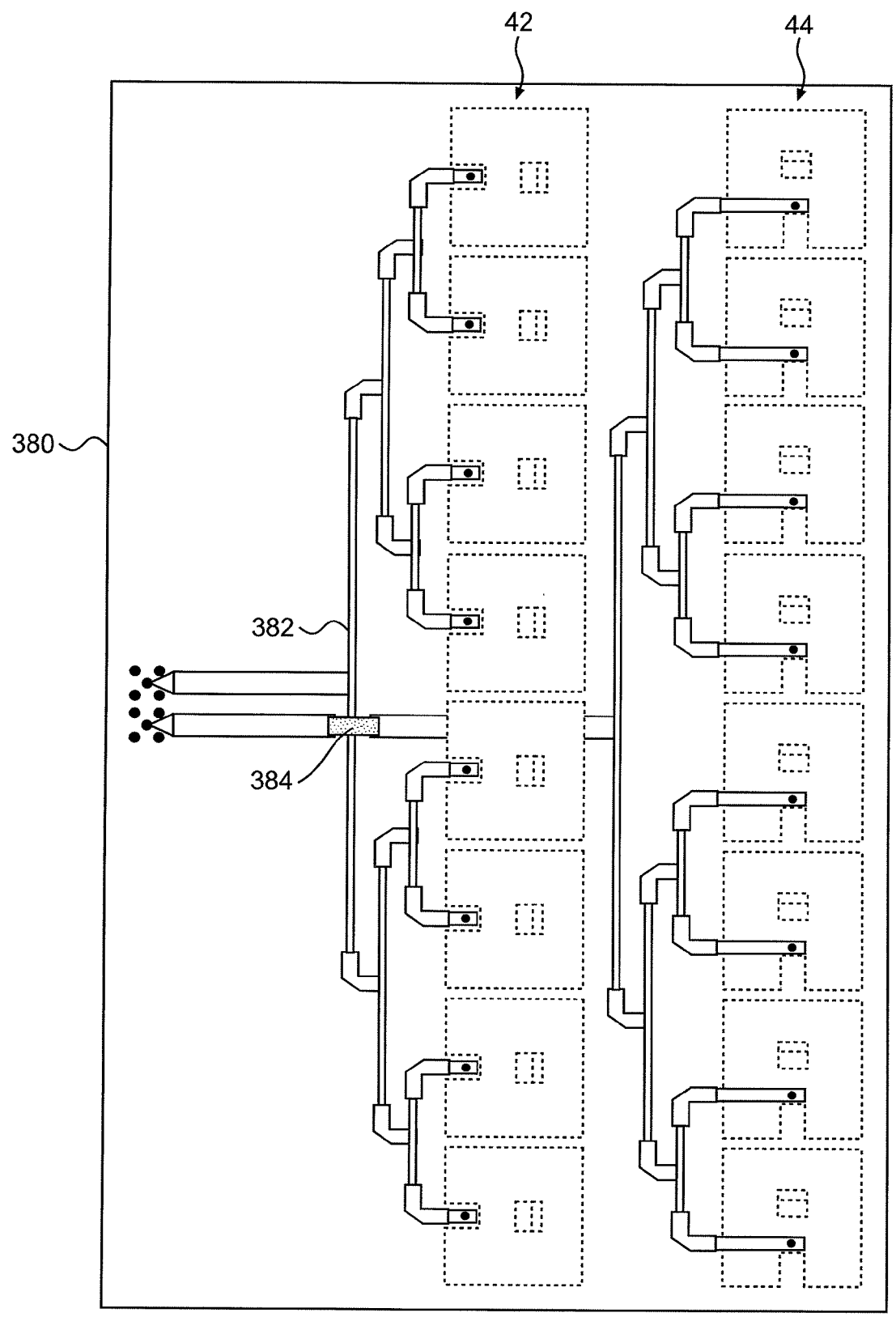
FIG. 22 is a back plan view of an antenna array in accordance with an embodiment of the present invention.

Each access point also has a pair of oppositely polarized antenna arrays disposed on a printed circuit board. The circuit board and patch elements are similar to the board and elements of the subscriber unit antenna. FIG. 22 illustrates the back surface of the access point antenna circuit board base 380. Unlike the four-by-four subscriber unit arrays, the access point employs two eight-by-one arrays 382 and 384 for the two polarizations to allow an asymmetric beam of 60 degrees by 10 degrees. The two single-line arrays are disposed in parallel to each other on the same circuit board base. The patch elements are disposed 90 degrees with respect to each other. The vertically polarized array 44 traverses the feed line 382 of the horizontally polarized array by a surface mounted capacitor or jumper 384 that is electrically isolated from feed line 382.

Each subscriber unit includes in its memory a table that lists each of the six possible frequency channels at which an access point might broadcast. When the subscriber unit is first activated in the sector of an access point, the subscriber unit microprocessor sequentially sets the transceiver to each of the channels listed in the table. At each of the channel settings, the microprocessor controls the electronic switch between the coaxial connectors from the two arrays so that the subscriber unit receives signals from one antenna polarization for a first period of time and receives signals from the oppositely polarized antenna array for the remaining time at which the transceiver is set to the frequency channel. The microprocessor keeps the subscriber unit in receive mode at each channel/polarization setting for a period of time related to a time in which it can be expected to receive a transmit grant from the access point or recognize the access point expected to eventually send a transmit grant. Since the subscriber unit is, at this point, in group eight of the polling algorithm described above with respect to FIG. 9, the timer at each setting should account for the timer limits for that group.

If the subscriber unit fails to receive a transmit grant during this period, it moves to the next channel/polarization setting and cycles through these settings until receiving a transmit grant. Upon receiving the grant, the subscriber unit thereafter remains at the setting at which the transmit grant was received. The subscriber unit remains at the setting until re-started or until a system operator manually changes the setting through a command packet transmitted from the access point.

Figure 23:
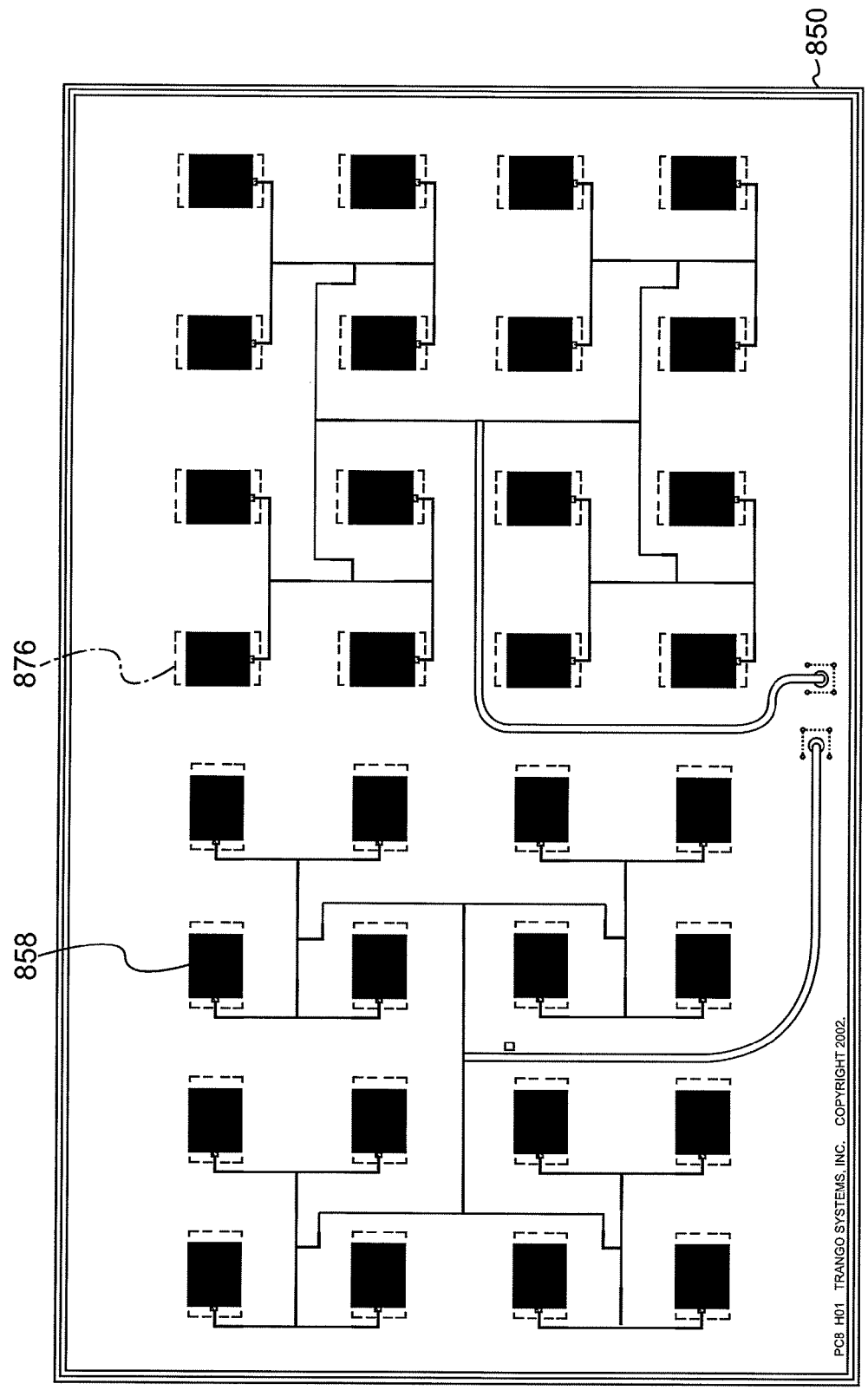
FIG. 23 is a partial top view of an antenna array in accordance with an embodiment of the present invention.
Figure 24:
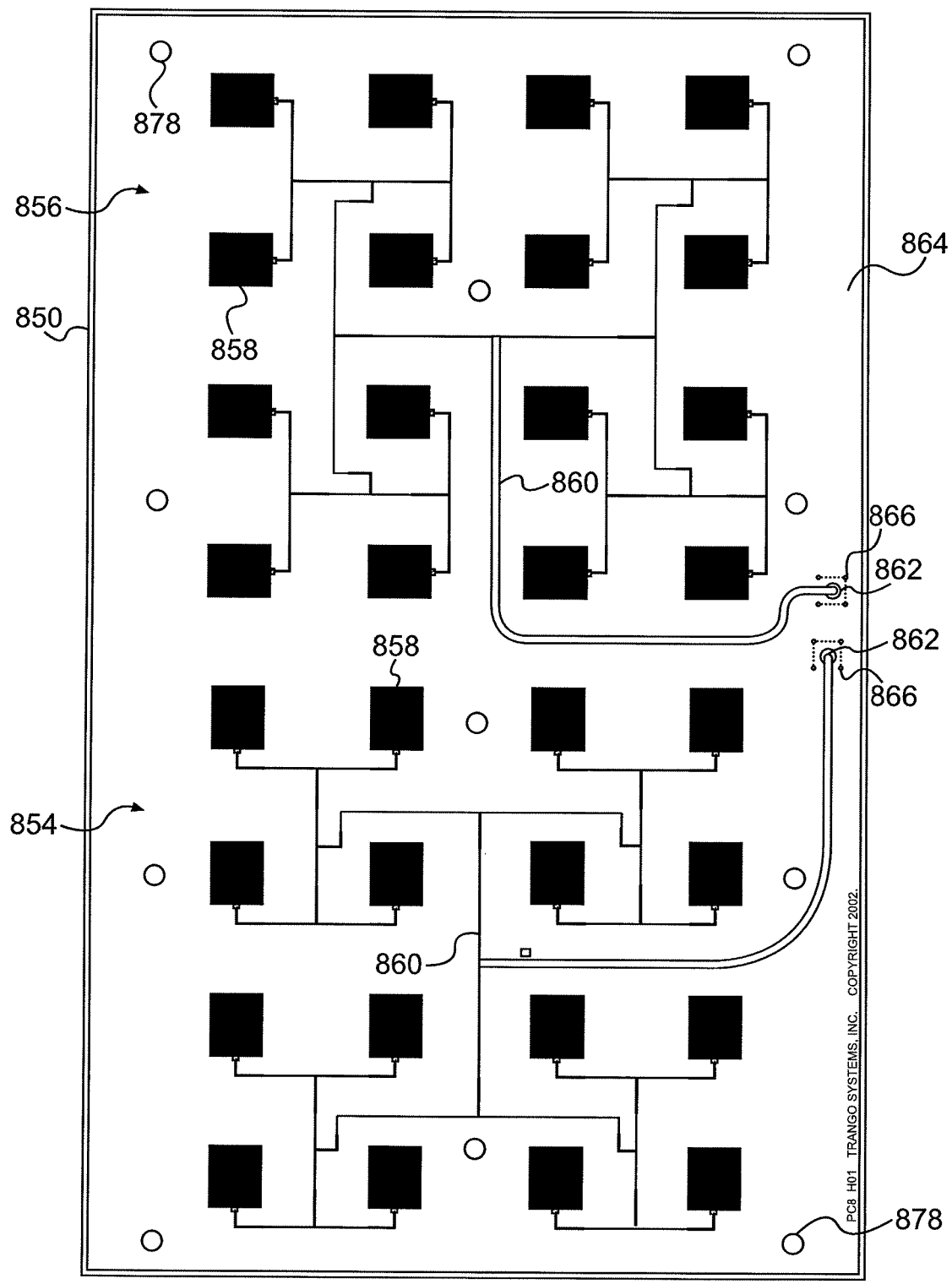
FIG. 24 is a top view of a main board of the antenna as in FIG. 23.
Figure 25:
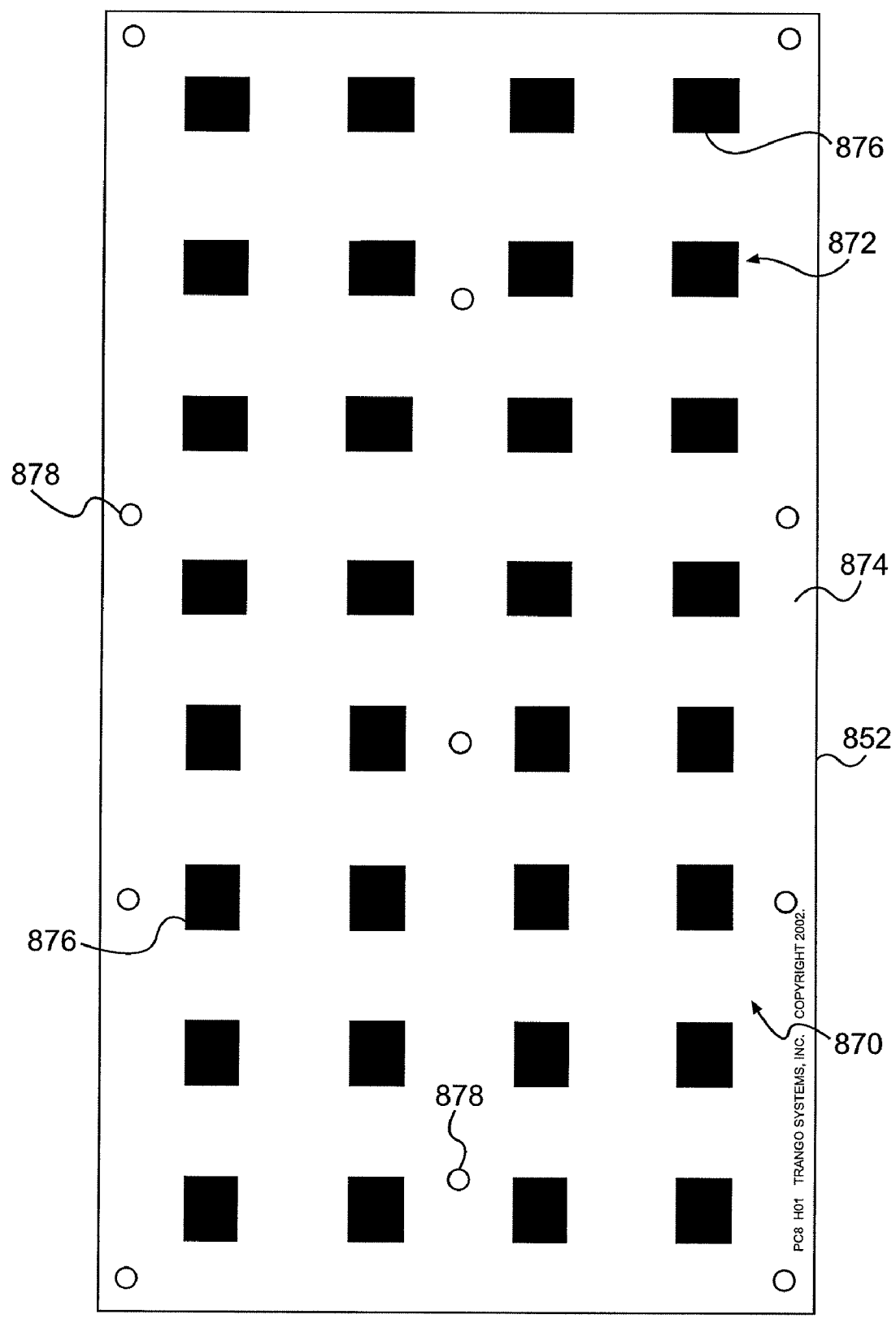
FIG. 25 is a bottom view of a secondary board of the antenna as in FIG. 23.

FIGS. 23-25 illustrate an example of a stacked electromagnetically-coupled patch array antenna. The antenna includes a main printed circuit board 850 and a secondary board 852 disposed in parallel to and above main board 850. The main board is 0.0321" thick and is made from ROGERS R4003 low loss material. Vertical-polarization and horizontal-polarization main patch arrays 854 and 856 each comprises sixteen 0.473" by 0.597" patch elements 858 connected through a corporate feed network 860 to a connection point 862. The patch elements and feed networks are etched, in a similar manner as discussed above, from a copper foil layer disposed on the top side 864 of main board 850.

A via extends through main board 850 at each connection point 862 from top side 864 to a bottom side (not shown) of the main board. A copper foil layer (not shown) on the bottom side forms a ground plane. Relief areas (not shown) are formed in the copper ground plane layer around the connection point vias and partially around each of four holes 866 disposed about the connection points. Vias may also be provided in holes 866. At each connection point, a coaxial connector, like the connector discussed above with respect to FIG. 20, is attached from the bottom side of the main board so that a center conductor extends through the via to electrically connect to the respective feed network. Pins received in holes 866 ground the connector's outer conductor.

Vertical-polarization and horizontal-polarization parasitic patch arrays 870 and 872 are disposed on a bottom side 874 of secondary board 852 so that arrays 870 and 872 face main arrays 854 and 856 across an air-filled gap. In the present embodiment, the parasitic array sits 0.170" above the main array. Parasitic patch elements 876 are 0.473" by 0.793" in size and are etched from a copper foil layer disposed on bottom side 874 in a similar manner as discussed above. The alignment of the parasitic array patch elements with respect to the main array patch elements is illustrated in FIG. 23, which overlays the parasitic arrays over the main arrays. As should be understood in this art, there is no feed network on the secondary board, and there is no foil ground plane on the secondary board's top side (not shown). Secondary board 852 is 0.008" thick and is made from FR4 material. The secondary and main boards may be separated from each other by nonconductive spacers extending between holes 878 in the main and secondary boards that receive the spacers. Alternatively, or additionally, the boards may be secured in an frame made from an ABS material.

Figure 26:
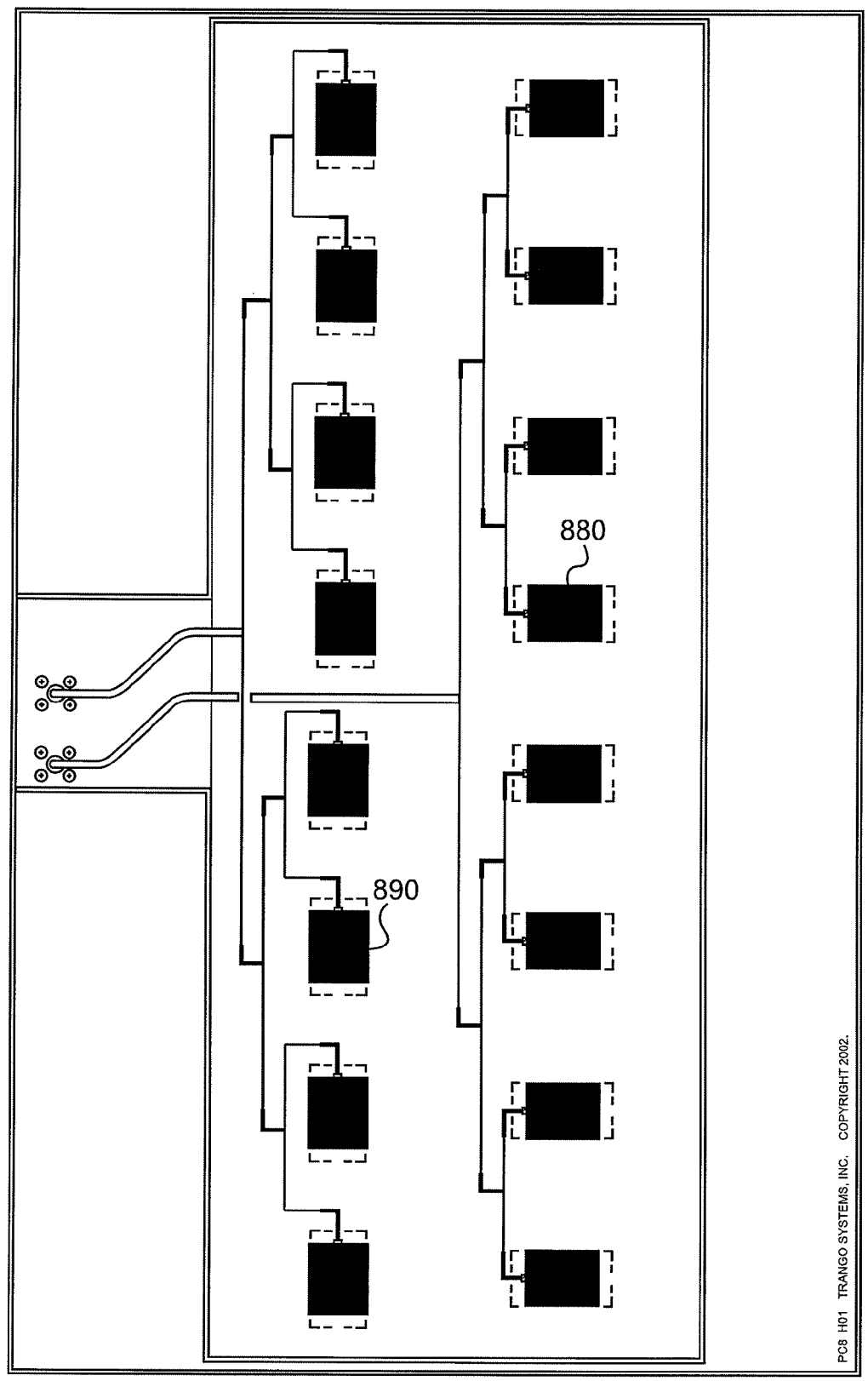
FIG. 26 is a partial top view of an antenna array in accordance with an embodiment of the present invention.

FIGS. 23-25 illustrate a subscriber unit antenna arrangement. FIG. 26 illustrates an overlay view of an access point antenna arrangement that is very similar in structure to the subscriber unit antenna. The main arrays are formed on the top side of the main board, and the parasitic arrays are formed on the bottom side of the secondary board. The main and secondary boards are constructed in the same manner as the boards in the subscriber unit antenna. Like the subscriber unit antenna, the access point main arrays output to feed networks etched on the main board's top side, whereas the secondary board has no feed networks or ground plane. A ground plane foil layer is formed on the bottom of the main board, and a pair of coaxial connectors connect to the main board bottom side, similarly to the connectors attached to the subscriber unit antenna. Three dark bands on either side of the main arrays represent ground areas left on the main board top surface. These areas do not affect antenna performance and may be omitted. In one embodiment, RF-absorbent material is applied to the main board at these areas to reduce side lobes.

In the access point antenna, however, the vertical-polarization and horizontal-polarization patch arrays are disposed in parallel single lines. As with the subscriber unit array, parasitic patch elements 880 are disposed 0.170" above main patch elements 890 across an air gap.

Because of its wider achievable bandwidth (e.g. 12%), the electromagnetically-coupled patch array antenna may be used in an embodiment in which the access point and the subscriber units may communicate over either of two frequency bands, as opposed to a single band, using the same antenna. Using the antennas illustrated in FIGS. 23-26, for example, the access point and subscriber unit transmitter/receivers may be configured to communicate at a 5.25-5.35 GHz band, as well as the 5.725-5.850 GHz band discussed above.

The transmitter/receivers of the access point and the subscriber units are modified to allow switching between the different bands. For example, the subscriber unit transmitter/receiver, as shown in the functional diagram provided in FIG. 8, may be modified to include a wideband VCO/PLL for a local oscillator that tunes from 4.77-5.37 GHz. The single RF transmit path (i.e. the upper path directed from left to right in FIG. 8) is replaced by two parallel paths, one using 5.8 GHz filters and the other using 5.3 GHz filters. Two SPST switches are provided to allow switching between the two paths, and digital circuitry is provided to control the switches. On the receiver path, a wider band filter is provided to cover both bands. Similarly, the power amplifier is replaced with a wideband RF power amplifier. Similar modifications are made to the access point transmitter/receiver. Such modifications should be within the understanding of this art, and a more detailed discussion is, therefore, not provided herein. Moreover, it should be apparent that many variations in the transmitter and receiver circuitry may be practiced.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A patch array antenna, said antenna comprising:
   a base on which is defined a ground plane;
   a plurality of patch elements configured to resonate over a frequency range, each patch element
      isolated from the ground plane and disposed on the base over the ground plane so that an air dielectric is defined between the patch element and the ground plane, and
      defining a resonant portion;
   a feed network defined on the base so that the ground plane is between the feed network and the patch elements; and
   with respect to each patch element, a respective electric current conductor electrically connecting the resonant portion of the patch element and the feed network so that the feed network electrically connects the patch element to one or more output points on the base.

2. The antenna as in claim 1, wherein the ground plane is defined on a first side of the base, and the feed network is defined on a second side of the base opposite the first side.

3. The antenna as in claim 2, wherein the base is comprised of a polymer substrate, wherein the ground plane is comprised of a metallic foil sheet on one side of the polymer substrate, and the feed network is comprised of metallic foil traces on an opposite side of the polymer substrate.

4. The antenna as in claim 3, wherein the feed network is a corporate network extending from feed positions to a single output port.

5. The antenna as in claim 1, wherein each patch element includes a planar metallic main portion.

6. The antenna as in claim 5, wherein the main portions are disposed in a common plane.

7. The antenna as in claim 6, wherein each patch element forms the respective electric current conductor, and wherein the respective electric current conductor extends from a resonant area of the main portion to the base and is electrically connected to a respective feed position in the feed network.

8. The antenna as in claim 7, wherein each patch element includes a metallic post extending from a non-resonant area of the main portion to the base.

9. The antenna as in claim 7, wherein the patch elements are disposed so that the main portions and respective electric current conductors of the patch elements are in the same alignment and define an antenna polarization.

10. A point to multipoint wireless communication system, said system comprising:
an access point configured to receive data signals from an external system, the access point having an antenna, a processor and circuitry in communication with the access point antenna and controlled by the access point processor to transmit wireless electromagnetic signals corresponding to the data signals to, and receive wireless electromagnetic signals from, a geographic area; and
a plurality of subscriber units disposed within the area, each said subscriber unit having an antenna, a processor and circuitry controlled by the subscriber unit processor to transmit wireless electrical signals to, and receive wireless electrical signals from, the access point for communication with the external system,
wherein each of the access point antenna and the subscriber unit antennas comprises
a base on which is defined a ground plane,
a plurality of patch elements configured to resonate over a frequency range, each patch element
isolated from the ground plane and disposed on the base over the ground plane so that an air dielectric is defined between the patch element and the ground plane, and
defining a resonant portion,
a feed network defined on the base so that the ground plane is between the feed network and the patch elements, and
with respect to each patch element, a respective electric current conductor electrically connecting the resonant portion of the patch element and the feed network so that the feed network electrically connects the patch element to one or more output points on the base.

11. The antenna as in claim 10, wherein the ground plane is defined on a first side of the base, and the feed network is defined on a second side of the base opposite the first side.

12. The antenna as in claim 11, wherein the base is comprised of a polymer substrate, wherein the ground plane is comprised of a metallic foil sheet on one side of the polymer substrate, and the feed network is comprised of metallic foil traces on an opposite side of the polymer substrate.

13. The antenna as in claim 12, wherein the feed network is a corporate network extending from feed positions to a single output port.

14. The antenna as in claim 10, wherein each patch element includes a planar metallic main portion.

15. The antenna as in claim 14, wherein the main portions are disposed in a common plane.

16. The antenna as in claim 15, wherein each patch element forms the respective electric current conductor, and wherein the respective electric current conductor extends from a resonant area of the main portion to the base and is electrically connected to a respective feed position in the feed network.

17. The antenna as in claim 16, wherein each patch element includes a metallic post extending from a non-resonant area of the main portion to the base.

18. The antenna as in claim 16, wherein the patch elements are disposed so that the main portions and respective electric current conductors of the patch elements are in the same alignment and define an antenna polarization.

* * * * *

UNITED STATES PATENT AND TRADEMARK OFFICE
CERTIFICATE OF CORRECTION

PATENT NO. : 7,835,769 B2  
APPLICATION NO. : 12/107211  
DATED : November 16, 2010  
INVENTOR(S) : Christopher A. Gustaf Page 1 of 1

It is certified that error appears in the above-identified patent and that said Letters Patent is hereby corrected as shown below:

In the Specification,

Column 8, line 67, please replace the "," after the word "units" with a --.--.

Column 30, line 57, please replace the number "0.0321" with the number --0.032--.

Signed and Sealed this
Twelfth Day of May, 2015

Michelle K. Lee
*Director of the United States Patent and Trademark Office*